(12) United States Patent
Takano et al.

(10) Patent No.: US 6,643,031 B1
(45) Date of Patent: Nov. 4, 2003

(54) IMAGE PROCESSING APPARATUS

(75) Inventors: Gaku Takano, Yokohama (JP); Hiroki Kanno, Yokohama (JP)

(73) Assignees: Kabushiki Kaisha Toshiba, Kawasaki (JP); Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/467,976

(22) Filed: Dec. 21, 1999

(30) Foreign Application Priority Data

Dec. 21, 1998 (JP) .......................................... 10-362786

(51) Int. Cl.[7] .............................................. G06L 15/00
(52) U.S. Cl. ........................................ 358/1.9; 358/3.06
(58) Field of Search ................................. 358/1.9, 3.06, 358/3.09, 3.13, 3.16, 3.17

(56) References Cited

U.S. PATENT DOCUMENTS

| | | | |
|---|---|---|---|
| 5,543,935 A | 8/1996 | Harrington | 358/429 |
| 5,583,661 A | * 12/1996 | Kurita | |
| 5,586,227 A | * 12/1996 | Kawana | |
| 5,694,224 A | 12/1997 | Tai | 358/455 |
| 5,696,853 A | * 12/1997 | Kawana | |
| 5,754,309 A | 5/1998 | Chen et al. | 358/456 |
| 5,815,287 A | 9/1998 | Yamada | 358/458 |

FOREIGN PATENT DOCUMENTS

| | | | | |
|---|---|---|---|---|
| JP | 7-254986 | 10/1995 | | H04N/1/405 |
| JP | 8-125863 | 5/1996 | | H04N/1/405 |
| JP | 8-160682 | 6/1996 | | G03G/15/00 |
| JP | 08-307669 | 11/1996 | | H04N/1/40 |
| JP | 09-224164 | 8/1997 | | H04N/1/60 |
| JP | 10-145598 | 5/1998 | | H04N/1/407 |

\* cited by examiner

*Primary Examiner*—Jerome Grant, II
(74) *Attorney, Agent, or Firm*—Foley & Lardner

(57) ABSTRACT

For an image signal having density equal to or larger than a predetermined threshold value, this invention realizes stable reproduction by reducing intermediate transition regions by increasing the intervals between pixels in the pixel arrangement of a non-image portion. For an image density signal whose density is smaller than the threshold value, the invention uses half-tone processing with higher resolution to thereby improve the image quality. This improves the reproducibility of pixel structures such as dots and line patterns at high densities, improves the stability of tone reproduction against environments, and improves the image quality.

18 Claims, 28 Drawing Sheets

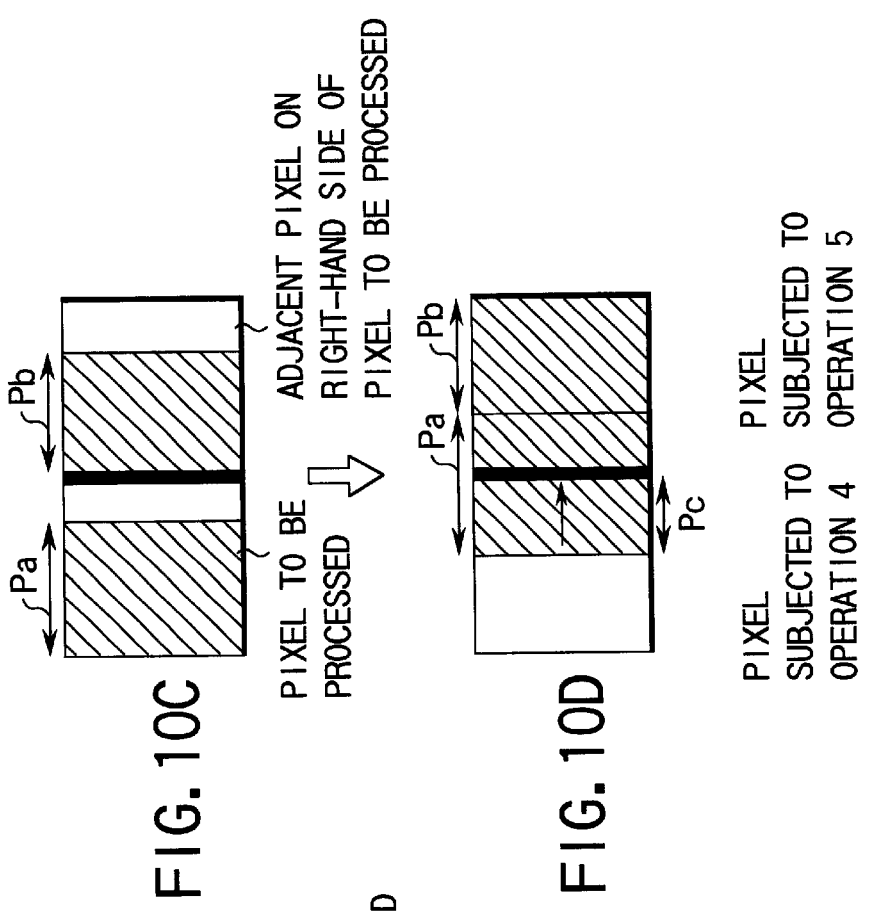

VERTICAL THREE-PIXEL
LINE STRUCTURE

| PIXEL NUMBER | | SHIFT OPERATION |
|---|---|---|
| x%3 | 0 | THRU |
| | 1 | OPERATION 2 |
| | 2 | GIVEB |

VERTICAL THREE-PIXEL
LINE STRUCTURE

| PIXEL NUMBER | | REFERENCE POSITION |
|---|---|---|
| x%3 | 0 | RIGHT |
| | 1 | LEFT |
| | 2 | LEFT |

VERTICAL THREE-PIXEL
LINE STRUCTURE

THREE-PIXEL SCREEN (63°) STRUCTURE

| SHIFT OPERATION | | | | |
|---|---|---|---|---|
| | | \multicolumn{3}{c}{x%3} | | |
| | | 0 | 1 | 2 |
| y%6 | 0 | OPERATION 1 | OPERATION 2 | OPERATION 3 |
| | 1 | OPERATION 4 | OPERATION 5 | OPERATION 1 |
| | 2 | OPERATION 3 | OPERATION 1 | OPERATION 2 |
| | 3 | OPERATION 1 | OPERATION 4 | OPERATION 5 |
| | 4 | OPERATION 2 | OPERATION 3 | OPERATION 1 |
| | 5 | OPERATION 5 | OPERATION 1 | OPERATION 4 |

FIG. 13A

THREE-PIXEL SCREEN (63°) STRUCTURE

| REFERENCE POSITION | | | | |
|---|---|---|---|---|
| | | x%3 | | |
| | | 0 | 1 | 2 |
| y%6 | 0 | RIGHT | LEFT | LEFT |
| | 1 | RIGHT | RIGHT | LEFT |
| | 2 | LEFT | RIGHT | LEFT |
| | 3 | LEFT | RIGHT | RIGHT |
| | 4 | LEFT | LEFT | RIGHT |
| | 5 | LEFT | LEFT | RIGHT |

FIG. 13B

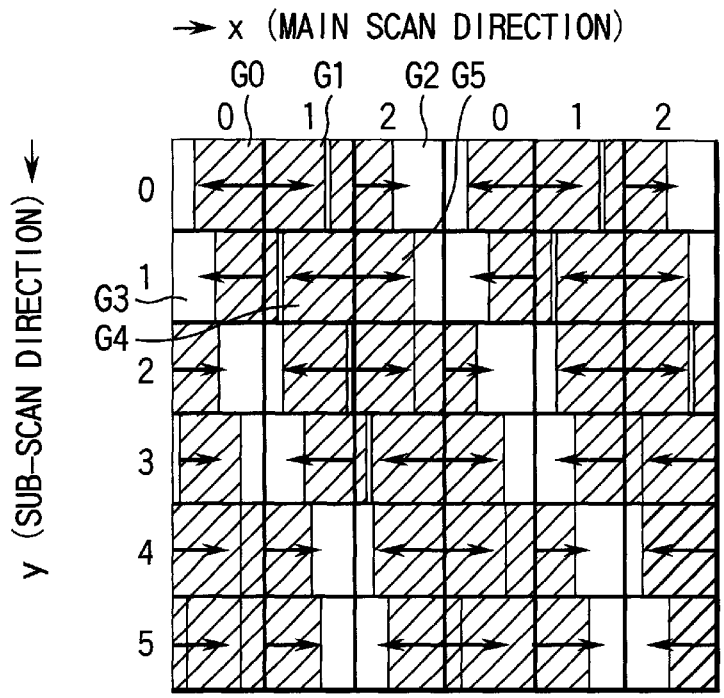
FIG. 14  THREE-PIXEL-MODULATED SCREEN (63°) STRUCTURE
VERTICAL ONE-PIXEL LINE STRUCTURE
FIG. 16
| PIXEL NUMBER | REFERENCE POSITION |
|---|---|
| x%1 | 0 | LEFT |
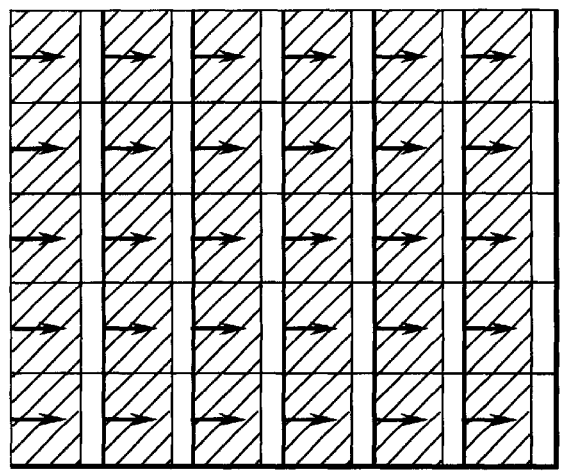
FIG. 17  VERTICAL ONE-PIXEL LINE STRUCTURE

SECTIONS OF EXPOSURE DISTRIBUTIONS
IN MAIN SCAN DIRECTION

SECTIONS OF EXPOSURE DISTRIBUTIONS
IN MAIN SCAN DIRECTION

VERTICAL TWO-PIXEL
LINE STRUCTURE

| PIXEL NUMBER | | SHIFT OPERATION |
|---|---|---|
| x%2 | 0 | OPERATION 1 |
| | 1 | OPERATION 1 |

VERTICAL TWO-PIXEL
LINE STRUCTURE

| PIXEL NUMBER | | REFERENCE POSITION |
|---|---|---|
| x%2 | 0 | RIGHT |
| | 1 | LEFT |

VERTICAL TWO-PIXEL
LINE STRUCTURE

| DATA TO BE QUANTIZED | QUANTIZED OUTPUT | |
|---|---|---|
| | TWO-VALUED | FOUR-VALUED |
| 0~2A | 00 | 00 |
| 2B~7F | 00 | 55 |
| 80~D4 | FF | AA |
| D5~FF | FF | FF |

FIG. 25

HIGH-QUANTIZATION-NUMBER FIRST ERROR DIFFUSING MEANS

LOW-QUANTIZATION-NUMBER SECOND ERROR DIFFUSING MEANS

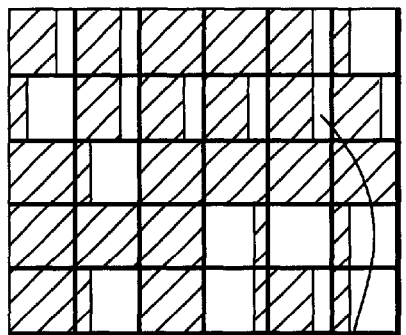
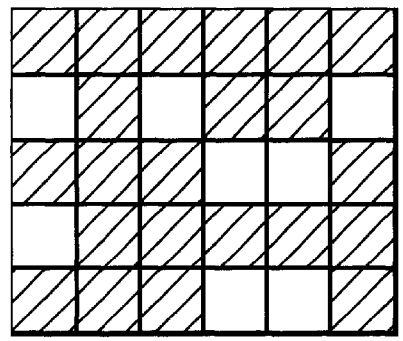

FOUR-VALUED ERROR DIFFUSION / SAME AREA RATIO / TWO-VALUED ERROR DIFFUSION

UNSTABLE BECAUSE NON-IMAGE PORTIONS ARE FINELY DIVIDED TO PRODUCE MANY INTERMEDIATE TRANSITION REGIONS

STABLE BECAUSE NON-IMAGE PORTIONS GATHER IN THE SIZE OF ONE PIXEL TO REDUCE INTERMEDIATE TRANSITION REGIONS

FIRST DITHER MATRIX OF IMAGE
PORTION CLUSTERED TYPE
| 7 | 8 | 9 | 10 |
|---|---|---|----|
| 6 | 1 | 2 | 11 |
| 5 | 4 | 3 | 12 |
| 16| 15| 14| 13 |
FIG. 29A
SECOND DITHER MATRIX OF NON-IMAGE
PORTION CLUSTERED TYPE
| 10 | 9  | 8  | 7 |
|----|----|----|---|
| 11 | 16 | 15 | 6 |
| 12 | 13 | 14 | 5 |
| 1  | 2  | 3  | 4 |
FIG. 29B
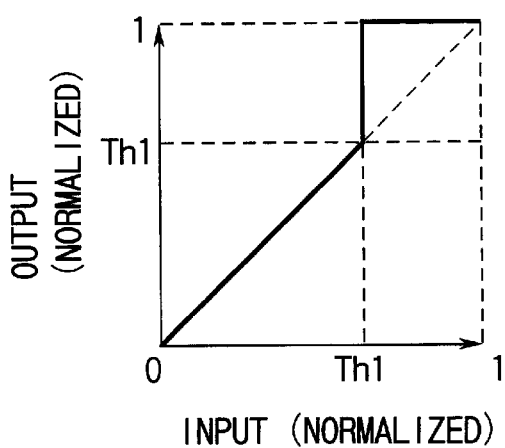
SATURABLE
LOOK-UP TABLE
FIG. 31
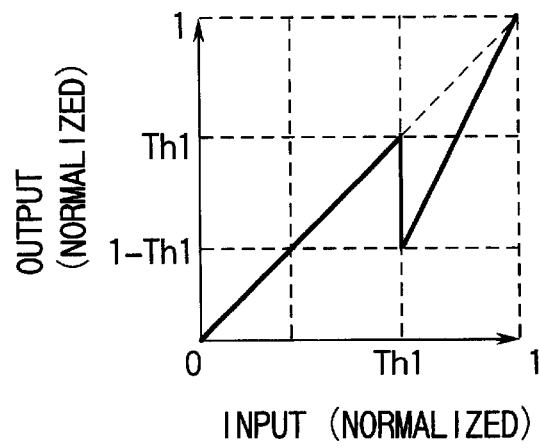
UNSATURABLE
LOOK-UP TABLE
FIG. 32

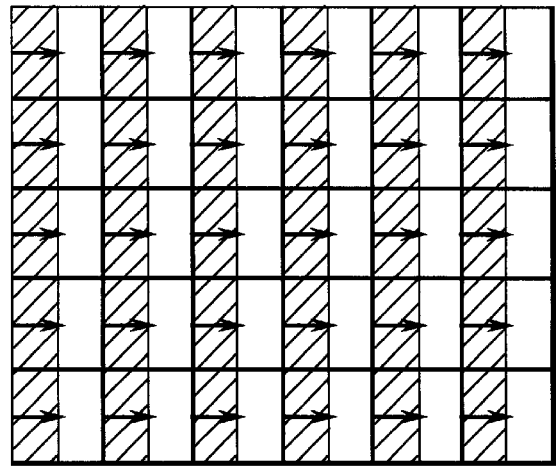
FIG. 33  OUTPUT PATTERN AT LOW AND MEDIUM DENSITIES
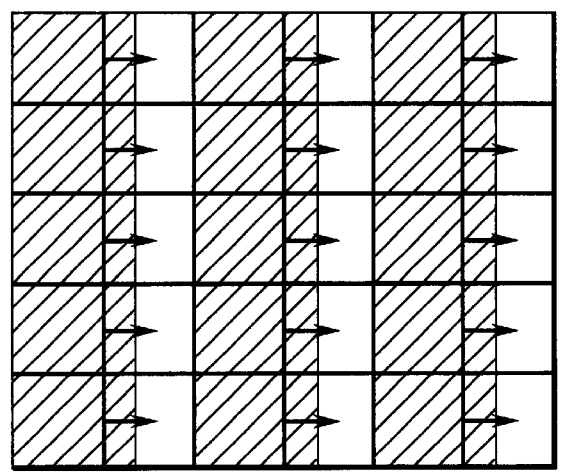
FIG. 34  OUTPUT PATTERN AT HIGH DENSITIES
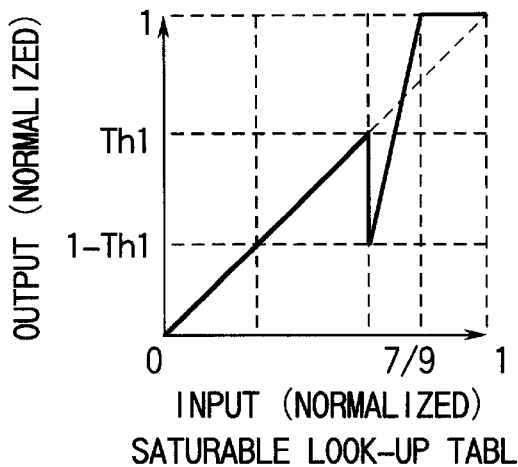
SATURABLE LOOK-UP TABLE
FIG. 35
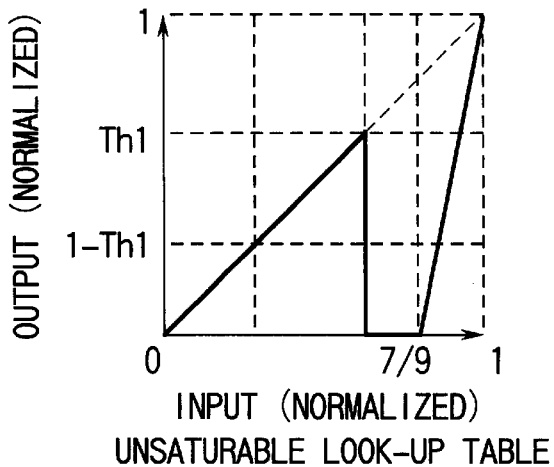
UNSATURABLE LOOK-UP TABLE
FIG. 36

FIG. 37
| SELECTION OF LOOK-UP TABLE | | | | |
|---|---|---|---|---|
| | | x%3 | | |
| | | 0 | 1 | 2 |
| y%3 | 0 | FIG. 31 | FIG. 31 | FIG. 31 |
| | 1 | FIG. 31 | FIG. 35 | FIG. 35 |
| | 2 | FIG. 31 | FIG. 36 | FIG. 36 |
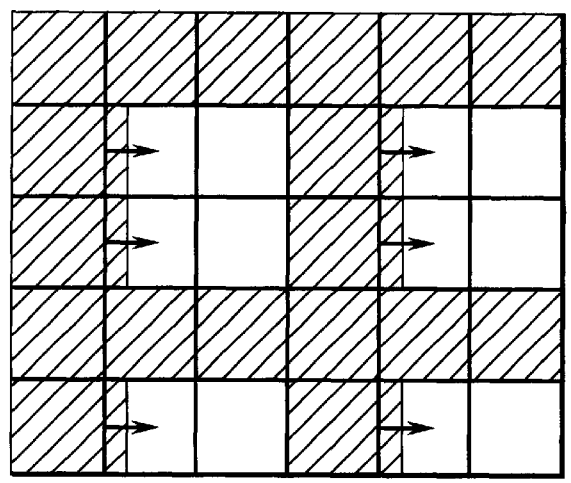
FIG. 38   OUTPUT PATTERN AT HIGH DENSITIES
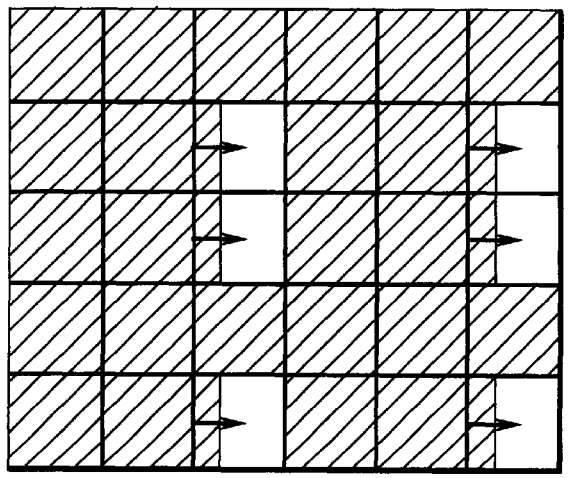
FIG. 39   OUTPUT PATTERN AT HIGH DENSITIES

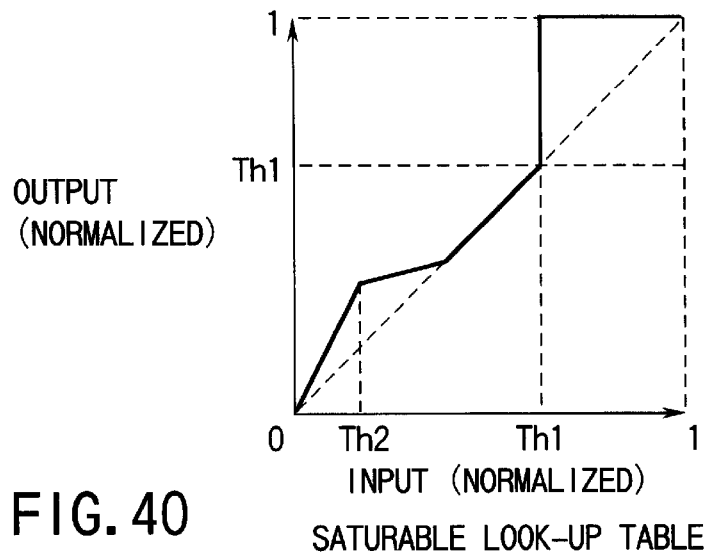
FIG. 40  SATURABLE LOOK-UP TABLE
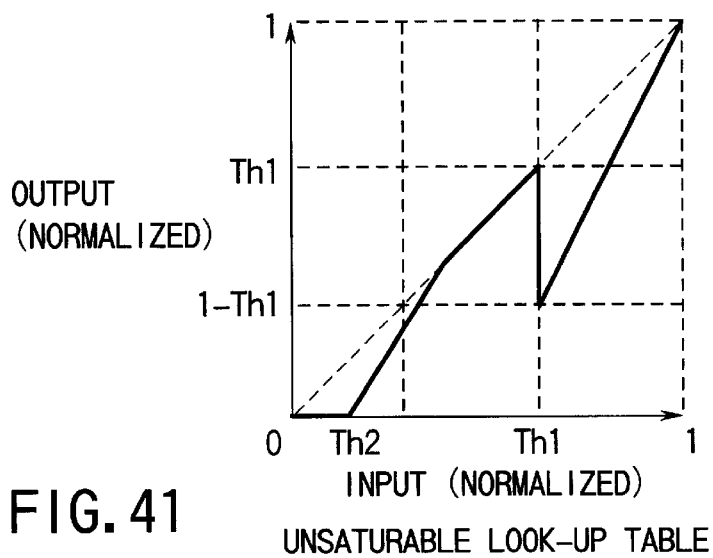
FIG. 41  UNSATURABLE LOOK-UP TABLE
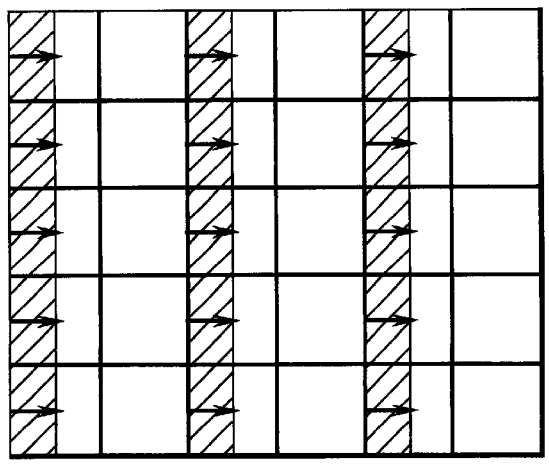
FIG. 42  OUTPUT PATTERN AT LOW DENSITIES

IMAGE PROCESSING APPARATUS

BACKGROUND OF THE INVENTION

The present invention relates to an electrophotographic image processing apparatus for forming a latent image on a photosensitive body by scanning a laser beam, and forming an image by developing this latent image with toner.

In conventional digital copying machines, particularly monochromatic digital copying machines (DPPCs), the tone reproduction characteristic is caused to saturate in a high-density portion. Therefore, the stability in this high-density portion with respect to environmental variations is not an important problem in image quality.

Also, to improve stable reproducibility in a low-density portion, a gray level processing system has been proposed by which halftone processing methods for a low-density portion are switched. However, no invention has improved stable reproducibility in a high-density portion.

In color image recording apparatuses such as color digital copying machines, the tone reproduction characteristic is desirably linear. Additionally, stable reproducibility highly resistant to environmental variations is required even in a high-density portion, since unstable tone reproduction leads to variations in hue. In electrophotographic recording in which a latent image is formed on a photosensitive body by scanning a laser beam and developed with toner to form an image, to improve the reproducibility in a high-density portion it is necessary to reduce unstable intermediate transition regions, which exist in the boundaries between image portions and non-image portions, and in which toner is either developed or not developed.

A non-image portion is a region in which no toner image is formed because the region is not exposed, or not satisfactorily exposed, to a laser beam. In pulse width modulation type laser driving, a pulse OFF state exists in one pixel, and this portion is a non-image portion.

BRIEF SUMMARY OF THE INVENTION

It is an object of the present invention to detect a high-density portion and, if a high-density portion is detected, switch to a gray level processing method by which non-image portions of a plurality of pixels are clustered, thereby reducing the area of intermediate transition regions and improving the reproducibility and stability of the pixel structure in this high-density portion.

According to the present invention, there is provided an image forming method comprising the steps of:
reading an image signal in units of pixels;
generating a first driving signal corresponding to an image portion and a non-image portion in one pixel based on the read image signal of each pixel;
generating a second driving signal for clustering non-image portions of a plurality of pixels, on the basis of the read image signal of each pixel and an image signal of a peripheral pixel;
detecting whether the read image signal of each pixel has a density not less than a predetermined density;
selectively outputting the first driving signal if the image signal of the detected pixel has a density not less than the predetermined density;
selectively outputting the second driving signal if the image signal of the detected pixel has a density not more than the predetermined density;
outputting a laser beam on the basis of the selectively output first or second driving signal;
forming a latent image on a photosensitive body with the laser beam; and
forming an image by developing the formed latent image with toner.

According to the present invention, there is further an image forming apparatus comprising:
reading means for reading an image signal in units of pixels;
first generating means for generating a first driving signal corresponding to an image portion and a non-image portion in one pixel based on the image signal of each pixel read by the reading means;
second generating means for generating a second driving signal for clustering non-image portions of a plurality of pixels on the basis of the image signal of each pixel read by the reading means and an image signal of a peripheral pixel;
detecting means for detecting whether the image signal of each pixel read by the reading means has a density not less than a predetermined density;
first output means for selectively outputting the first driving signal generated by the first generating means if the image signal of the pixel detected by the detecting means has a density not less than the predetermined density, and selectively outputting the second driving signal generated by the second generating means if the image signal of the pixel detected by the detecting means has a density not more than the predetermined density;
second output means for outputting a laser beam on the basis of the first or second driving signal selectively output by the first output means;
forming means for forming a latent image on a photosensitive body with the output laser beam from the second output means; and
developing means for forming an image by developing with toner the latent image formed by the forming means.

According to the present invention, there is still further an image processing apparatus comprising:
detecting means for detecting whether a density of an image signal of an input pixel is not less than a predetermined density;
first converting means for converting the image signal into image signals of an image portion and a non-image portion for each pixel on the basis of the density of the image signal of each input pixel and a pixel position of each input pixel;
second converting means for converting the image signal into image signals of an image portion and a non-image portion for each pixel, on the basis of the density of the image signal of each input pixel and the pixel position of each input pixel, thereby clustering image signals of non-image portions of a plurality of pixels; and
output means for selectively outputting the image signal from the second converting means if the detecting means detects that the density of the image signal of the input pixel is not less than the predetermined density, and selectively outputting the image signal from the first converting means if the detecting means detects that the density of the image signal of the input pixel is not more than the predetermined density.

According to the present invention, there is still further an image processing apparatus comprising:

detecting means for detecting whether a density of an image signal of an input pixel is not less than a predetermined density;

first storage means for storing first basic dither information of a dither matrix used to cluster non-image portions of a plurality of pixels;

second storage means for storing second basic dither information of a dither matrix used to cluster image portions of a plurality of pixels;

first output means for selecting the first basic dither information stored in the first storage means if the density of the image signal of the pixel detected by the detecting means is not less than the predetermined density, selecting the second basic dither information stored in the second storage means if the density of the image signal of the pixel detected by the detecting means is not more than the predetermined density, and outputting dither information, based on the first or second basic dither information selected and a pixel position of the input pixel, as a threshold value;

second output means for quantizing the image signal of the input pixel by the threshold value from the first output means and outputting the quantized image signal;

first generating means for generating coordinate information in a main scan direction and coordinate information in a sub-scan direction based on the pixel position of the input pixel;

second generating means for generating a reference position signal in the pixel from the coordinate information in the main scan direction and the coordinate information in the sub-scan direction generated by the first generating means;

third output means for outputting an image density signal of a pixel to be processed after pixel value shifting, from the coordinate information in the main scan direction and the coordinate information in the sub-scan direction generated by the first generating means and the image density signal quantized by the second output means; and fourth output means for outputting as the reference position signal in the pixel generated by the second generating means and the image density signal of the pixel to be processed after pixel value shifting output from the third output means.

According to the present invention, there is still further an image processing apparatus comprising:

a plurality of converting means for converting each input pixel of a two-dimensional image in a main scan direction and a sub-scan direction into an image density signal;

a plurality of generating means provided in one-to-one correspondence with the plurality of converting means to generate a driving signal on the basis of the image density signal from a corresponding converting means; and output means for selecting the driving signal from one of the generating means at each main scan period of each input pixel of the image, and periodically changing a main-scan-direction initial phase, selected whenever scan is performed, in the sub-scan direction and outputting the phase, wherein the converting means include converting means for converting an input pixel corresponding to a high-density portion into an image density signal in a saturated range and converting means for converting an input pixel corresponding to a high-density portion into an image density signal in an unsaturated range.

According to the present invention, there is still further an image processing apparatus comprising:

a plurality of converting means for converting each input pixel of a two-dimensional image in a main scan direction and a sub-scan direction into an image density signal;

a plurality of generating means provided in one-to-one correspondence with the plurality of converting means to generate a driving signal on the basis of the image density signal from a corresponding converting means; and output means for selecting the driving signal from one of the generating means at each main scan period of each input pixel of the image, and periodically changing a main-scan-direction initial phase, selected whenever scan is performed, in the sub-scan direction and outputting the phase, wherein the converting means include converting means for converting an input pixel corresponding to a high-density portion into an image density signal in a saturated range, converting means for converting an input pixel corresponding to a high-density portion into an image density signal in an unsaturated range, converting means for converting an input pixel corresponding to a low-density portion into zero or an image density signal in a range within which no image is formed, and converting means for converting an input pixel corresponding to a low-density portion into an image density signal in a range within which an image is formed.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed-out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 10A to 10D are views for explaining shift operations;

FIGS. 13A and 13B are views showing the correspondence between shift operations and reference positions in an oblique three-pixel line structure (screen angle 63°);

FIG. 14 is a view for explaining the oblique three-pixel line structure;

FIG. 16 is a view showing the correspondence of a reference position in a vertical one-pixel line structure;

FIG. 17 is a view for explaining the vertical one-pixel line structure;

FIG. 25 is a view for explaining the number of data to be quantized and the quantized outputs;

FIGS. 26A and 26B are views for explaining the output pattern of a high-quantization-number first error diffusing means and the output pattern of a low-quantization-number second error diffusing means;

FIG. 29A is a view for explaining a first dither matrix of image portion clustered type;

FIG. 29B is a view for explaining a second dither matrix of non-image portion clustered type;

FIG. 31 is a view for explaining a saturable look-up table (LUT);

FIG. 32 is a view for explaining an unsaturable look-up table;

FIG. 33 is a view for explaining an output pattern at low and medium densities;

FIG. 34 is a view for explaining an output pattern at high densities;

FIG. 35 is a view for explaining a saturable look-up table;

FIG. 36 is a view for explaining an unsaturable look-up table;

FIG. 37 is a view for explaining periodic selection of look-up tables;

FIGS. 38 and 39 are views for explaining output patterns at high densities;

FIG. 40 is a view for explaining a look-up table that forms an image at low densities and saturates at high densities;

FIG. 41 is a view for explaining a look-up table that does not form any image at low densities and does not saturate at high densities; and FIG. 42 is a view for explaining an output pattern at low densities.

DETAILED DESCRIPTION OF THE INVENTION

One embodiment of the present invention will be described below with reference to the accompanying drawings.

Figure 1:
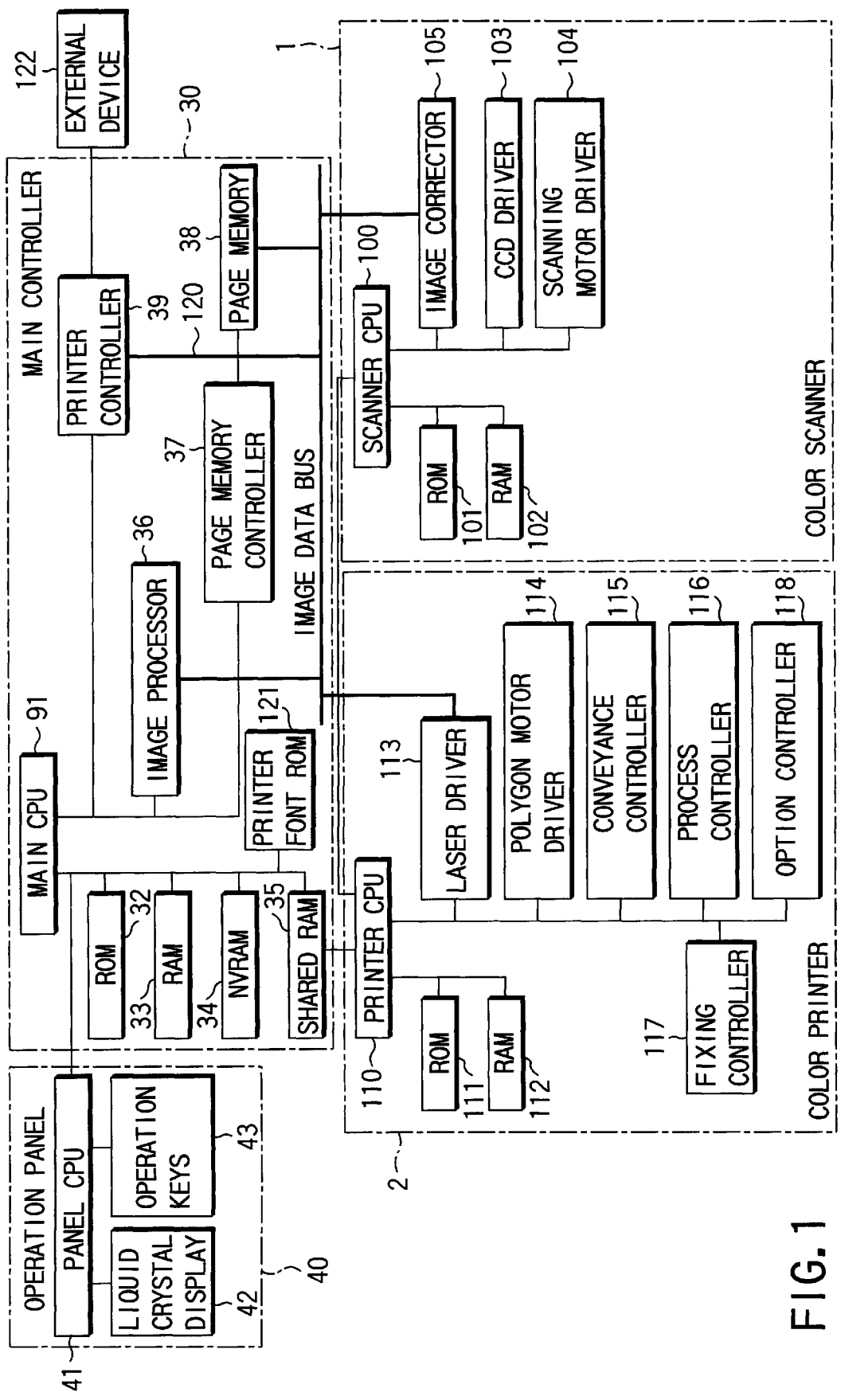
FIGS. 1 and 2 are views showing an outline of the arrangement of an image processor.

FIG. 1 is a block diagram schematically showing electrical connections and control signal flows in an image processing apparatus, such as a digital color/monochromatic copying machine, according to the present invention, which reads a color image or monochromatic image on an original and forms a copied image.

This image processing apparatus is roughly constructed of a color scanner 1 as an image input means which reads and inputs a color image on an original, and a color printer 2 as an image output means (recording device) which forms a copied image of the input color image.

Referring to FIG. 1, the control system comprises three CPUs (Central Processing Units): a main CPU 91 of a main controller 30, a scanner CPU 100 of the scanner 1, and a printer CPU 110 of the printer 2.

The main CPU 91 performs two-way communication via the printer CPU 110 and a shared RAM (Random Access Memory) 35.

That is, the main CPU 91 outputs an operation instruction to the printer CPU 110, and the printer CPU 110 returns a status to the main CPU 91.

The printer CPU 110 and the scanner CPU 100 perform serial communication.

That is, the printer CPU 110 outputs an operation instruction to the scanner CPU 100, and the scanner CPU 100 returns a status to the printer CPU 110.

An operation panel 40 has a liquid crystal display 42, various operation keys 43, and a panel CPU 41 connected to these components. This operation panel 40 is connected to the main CPU 91.

The main controller 30 includes the main CPU 91, a ROM (Read-Only Memory) 32, a RAM 33, an NVRAM 34, the shared RAM 35, an image processor 36, a page memory controller 37, a page memory 38, a printer controller 39, and a printer font ROM 121.

The main CPU 91 controls the overall image processing apparatus. The ROM 32 stores control programs and the like. The RAM 33 temporarily stores data.

The NVRAM (Nonvolatile RAM) 34 is a nonvolatile memory backed up by a battery (not shown) and holds stored data even when a power supply is turned off.

The shared RAM 35 is used to perform two-way communication between the main CPU 91 and the printer CPU 110.

The page memory controller 37 stores image information in the page memory 38 and reads out data from the page memory 38. The page memory 38 has an area capable of storing image information of a plurality of pages. This page memory 38 is so formed as to be able to store data, formed by compressing image information from the scanner 1, in units of pages.

The printer font ROM 121 stores font data corresponding to print data. The printer controller 39 rasterizes print data from an external device 122 such as a personal computer into image data, at resolution corresponding to data attached to the print data and indicating resolution, by using the font data stored in the printer font ROM 121.

The scanner 1 includes the scanner CPU 100 for controlling the overall scanner 1, a ROM 101 storing control programs and the like, a RAM 102 for storing data, a CCD driver 103 for driving a color image sensor (not shown), a scanning motor driver 104 for controlling the rotation of a scanning motor which moves a first carriage (not shown) and the like, and an image corrector 105.

The image corrector 105 includes an A/D converter (not shown), a shading correction circuit (not shown), a line memory (not shown), and the like. The A/D converter converts R, G, and B analog signals output from the color image sensor (not shown) into digital signals. The shading correction circuit corrects variations in threshold level with respect to an output signal from the color image sensor, caused by variations of the color image sensor or by an ambient temperature change. The line memory temporarily stores the shading-corrected digital signals from the shading correction circuit.

The printer 2 comprises the printer CPU 110 for controlling the overall printer 2, a ROM 111 storing control programs and the like, a RAM 112 for storing data, a laser driver 113 for driving a semiconductor laser oscillator (not shown), a polygon motor driver 114 for driving a polygon motor (not shown) of an exposure device (not shown), a conveyance controller 115 for controlling the conveyance of a paper sheet P by a conveyor mechanism (not shown), a process controller 116 for controlling charging, developing, and transferring processes by using a charging device (not shown), a developing roller (not shown), and a transfer device (not shown), a fixing controller 117 for controlling a fixing device (not shown), and an option controller 118 for controlling options.

Note that an image data bus 120 connects the image processor 36, the page memory 38, the printer controller 39, the image corrector 105, and the laser driver 113.

Figure 2:
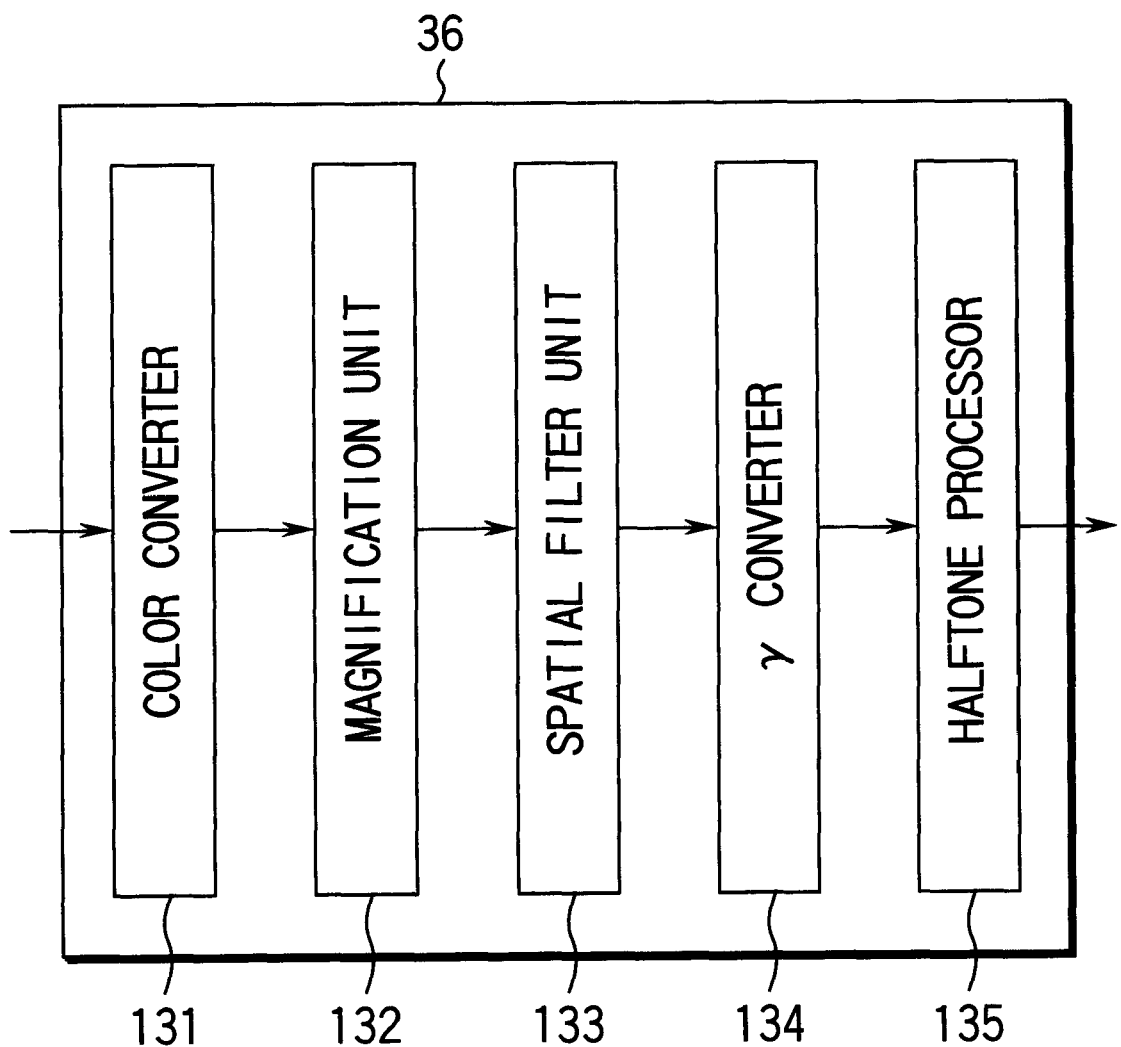

The image processor 36 converts input data into image data of C (Cyan), M (Magenta), and Y (Yellow) by color conversion, magnification, filtering, γ conversion, and halftoning. For example, as shown in FIG. 2, this image processor 36 includes a color converter 131, a magnification unit 132, a filter unit 133, a γ converter 134, and a halftone processor 135.

That is, output image data R (Red), G (Green), and B (Blue) from the scanner 1 are supplied to the color converter 131 where the data are converted into C, M, and Y image data.

The magnification unit 132 magnifies the output image data from the color converter 131. After that, the filter unit 133 performs filtering, and the γ converter 134 performs γ conversion. The halftone processor 135 then performs halftone processing, i.e., stable tone reproduction processing for a high-density portion. After that, the data are transferred to the printer 2.

The γ converter 134 corrects the γ characteristic of the printer 2. This correction is done by looking up a γ table (not shown) set for each of the C, M, and Y image data.

The halftone processor 135 performs gradation level processing for the image signal from the γ converter 134 and converts the signal into a recording device driving signal. This halftone processor 135 quantizes an input signal required by a recording device, so as not to impair the tone reproduction of an image density signal, or performs image density conversion meeting the characteristics of the recording device.

A recording device driving signal is a laser driving pulse signal which contains information about the length and reference position of a driving pulse for driving a printer laser modulator (not shown). A reference position indicates whether the left-hand end, right-hand end, or center of a pixel is to be driven.

A recording device driving signal of a power modulation type printer is also a laser driving pulse signal. However, the pulse width of this signal is always constant, and the energy intensity of the pulse forms a dot density.

The printer 2 forms a recording image in accordance with this recording device driving signal. When the printer 2 is of pulse width modulation type, the recording device driving signal is a driving pulse signal, and the laser is turned on or off in accordance with the driving pulse.

Figure 3:
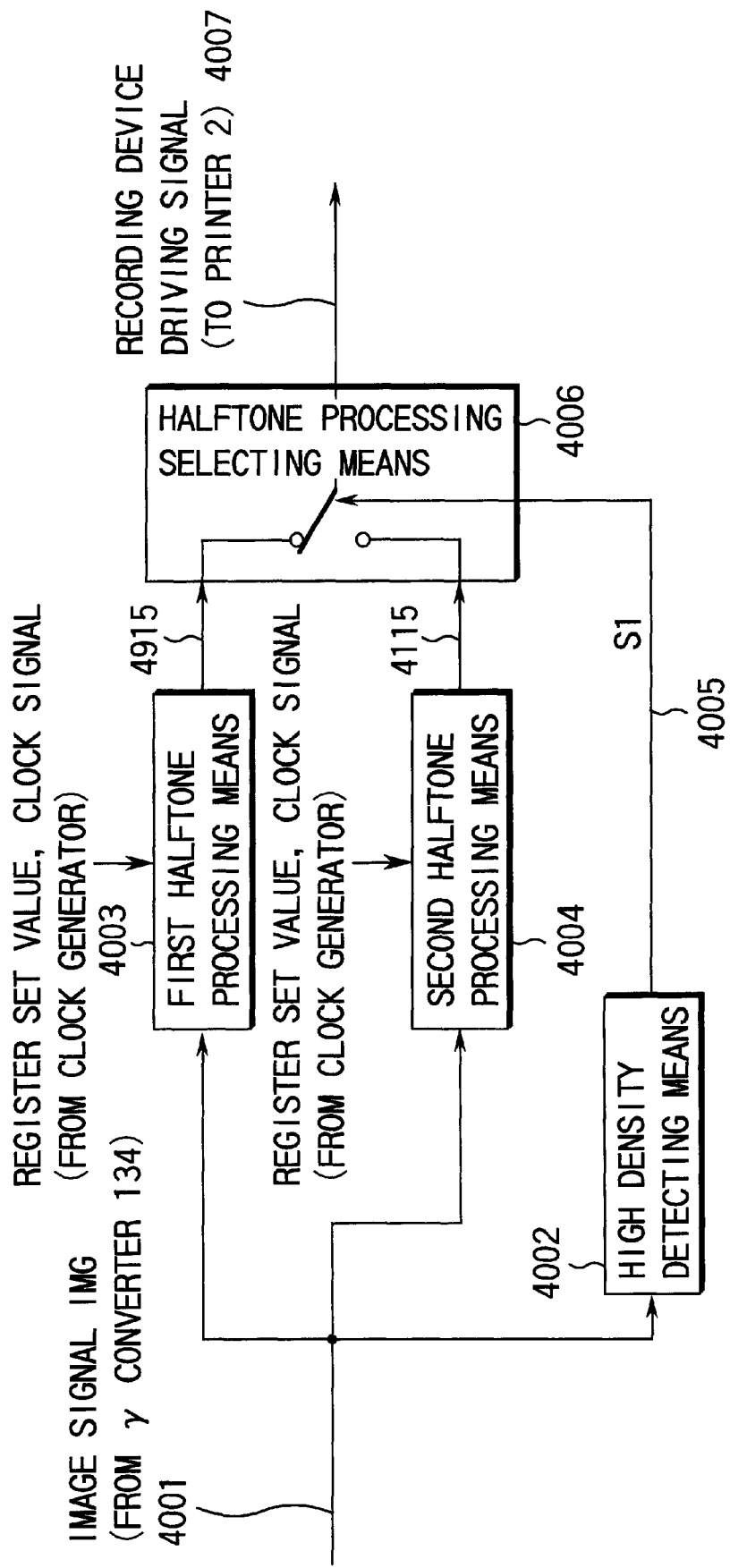
FIG. 3 is a block diagram showing an outline of the arrangement of the first embodiment of a halftone processor.

FIG. 3 shows an outline of the arrangement of the first embodiment of the halftone processor 135 as the core of the present invention. This halftone processor 135 includes a high density detecting means 4002, a first halftone processing means 4003 as an ordinary device, a second halftone processing means 4004 for clustering non-image portions of a plurality of pixels, and a halftone processing selecting means 4006.

Figure 4:
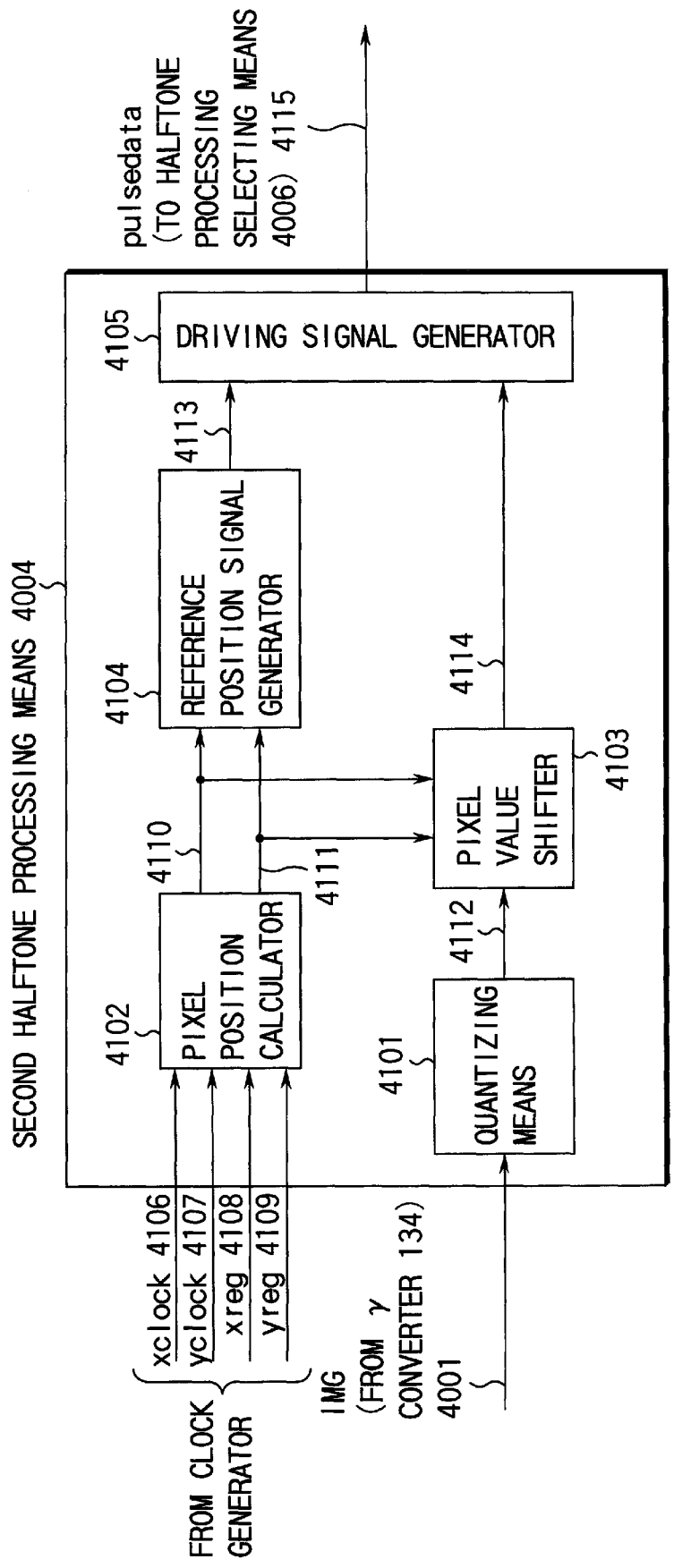
FIG. 4 is a block diagram showing an outline of the arrangement of a second halftone processing means.

The high-density detecting means 4002 compares a predetermined density value (threshold value) Th1 with an image signal (IMG) 4001 from the γ converter 134. A halftone processing selecting signal S1 output as a result of this comparison is determined by $S1=0$ $IMG<Th1$ $S1=2$ $IMG \geq Th1$ FIG. 4 shows the configuration of the second halftone processing means 4004 for clustering non-image portions of a plurality of pixels. That is, this second halftone processing means 4004 comprises a pixel position calculator 4102, a reference position signal generator 4104, a quantizing means (converting means) 4101, a pixel value shifter 4103, and a driving signal generator 4105.

The pixel position calculator 4102 calculates the pixel position of a signal currently being processed, on the basis of register set values xreg 4108 and yreg 4109, a clock signal xclock 4106 in a main scan direction, and a clock signal yclock 4107 in a sub-scan direction, each of which is supplied from a clock generator (not shown), and generates coordinate information x 4110 in the main scan direction and coordinate information y 4111 in the sub-scan direction.

The reference position signal generator 4104 generates a reference position signal 4113 from the coordinate information x 4110 in the main scan direction and the coordinate information y 4111 in the sub-scan direction supplied from the pixel position calculator 4102.

The quantizing means 4101 quantizes the input image signal IMG 4001 from the γ converter 134 in accordance with a predetermined threshold value and outputs the result as an image density signal 4112.

The pixel value shifter 4103 outputs an image density signal 4114 of a pixel to be processed after pixel value shifting, from the coordinate information x 4110 in the main scan direction and the coordinate information y 4111 in the sub-scan direction supplied from the pixel position calculator 4102 and the image density signal 4112 supplied from the quantizing means 4101.

The driving signal generator 4105 generates and outputs a recording device driving signal 4115 from the reference position signal 4113 supplied from the reference position signal generator 4104 and the pixel density signal 4114 of the pixel to be processed supplied from the pixel value shifter 4103. In pulse width modulation type laser recording electrophotography, the recording device driving signal 4115 is a laser driving pulse signal, and a laser beam is driven while the pulses are output. In this embodiment, the recording device driving signal 4115 is a laser driving pulse signal unless otherwise specified.

Figure 5:
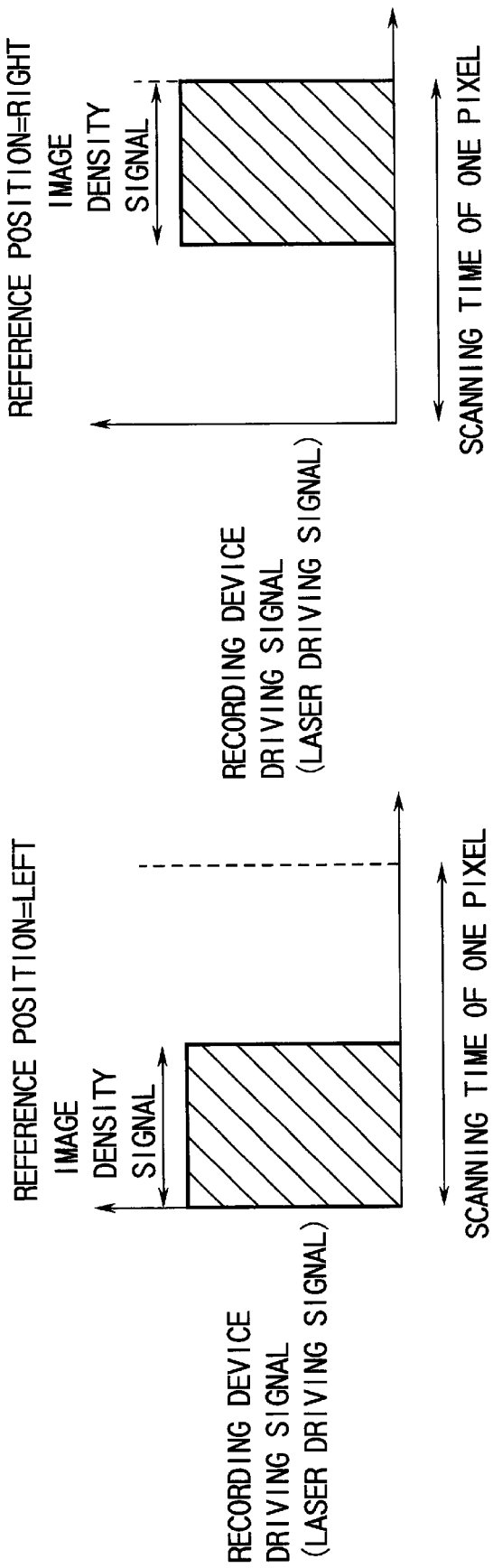
FIGS. 5A and 5B are views schematically showing a recording device driving signal.

FIGS. 5A and 5B show the relationships between the reference position signal 4113, the image density signal 4114 as an output value of a pixel to be processed, and the recording device driving signal 4115, in the driving signal generator 4105. FIG. 5A shows the relationship when the reference position is "left", and FIG. 5B shows the relationship when the reference position is "right".

Figure 6:
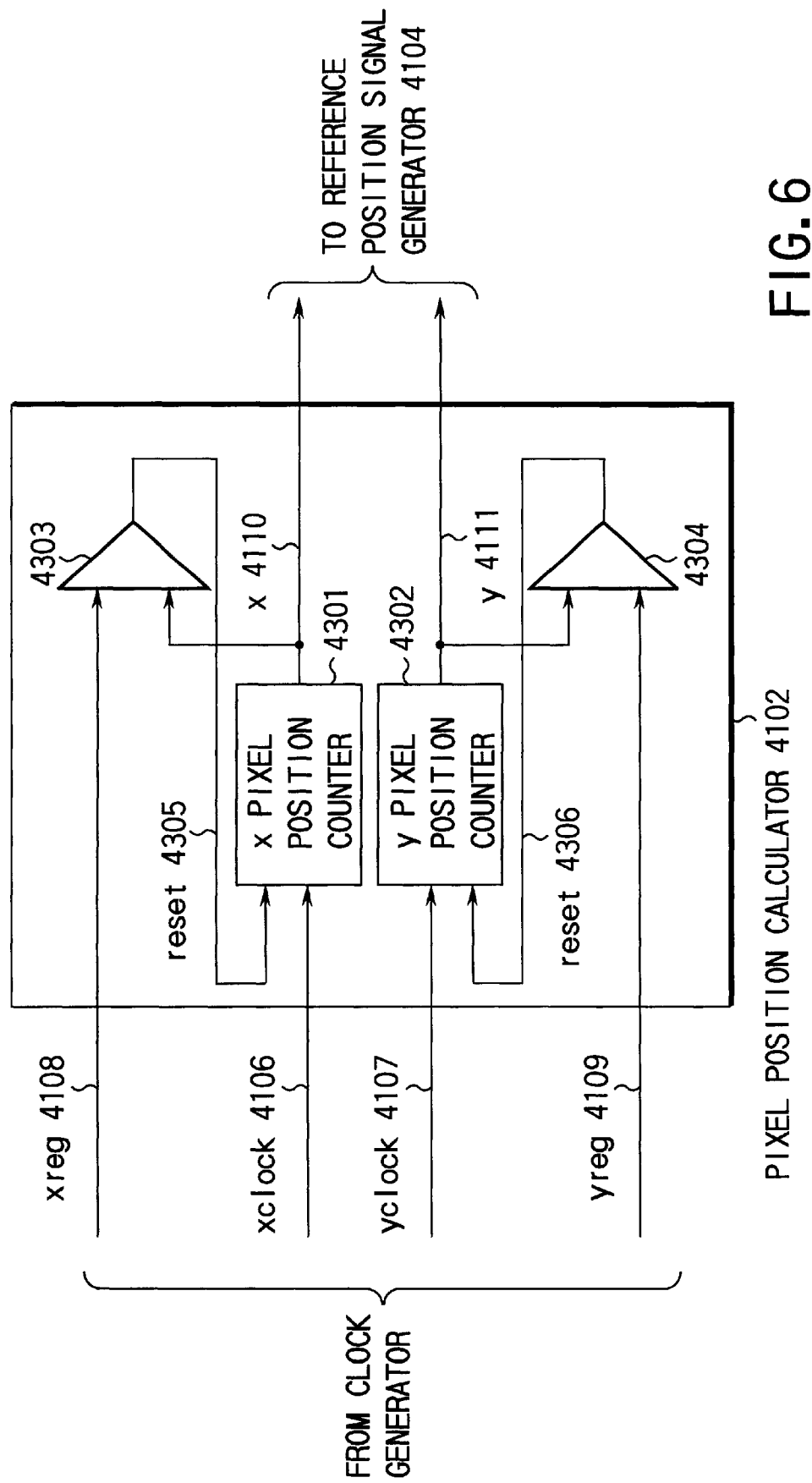
FIG. 6 is a block diagram showing the arrangement of a pixel position calculator.

FIG. 6 shows the configuration of the pixel position calculator 4102. This pixel position calculator 4102 includes an x pixel position counter 4301, a y pixel position counter 4302, and comparators 4303 and 4304.

The x pixel position counter 4301 is a synchronous reset counter which counts up by the clock signal xclock 4106 and outputs the count as the coordinate x 4110 in the main scan direction. When it is determined that the register set signal xreg 4108 is consistent with the x coordinate 4110 in the main scan direction, a reset signal 4305 is generated, and the counter 4301 is reset. That is, the x pixel position counter 4301 counts up from "0" to the register set value xreg 4108.

The y pixel position counter 4302 is a synchronous reset counter which counts up by the clock signal yclock 4107 and outputs the count as the coordinate y 4111 in the main scan direction. When it is determined that the register set signal yreg 4109 is consistent with the y coordinate 4111 in the sub-scan direction, a reset signal 4306 is generated, and the counter 4302 is reset. That is, the y pixel position counter 4302 counts up from "0" to the register set value yreg 4109.

The reference position signal generator 4104 is composed of a look-up table (not shown). This reference position signal generator 4104 receives the coordinate x 4110 in the main scan direction and the coordinate y 4111 in the sub-scan direction and generates a reference position signal ("left", "right", or "center" as a reference in a pixel).

Figure 7:
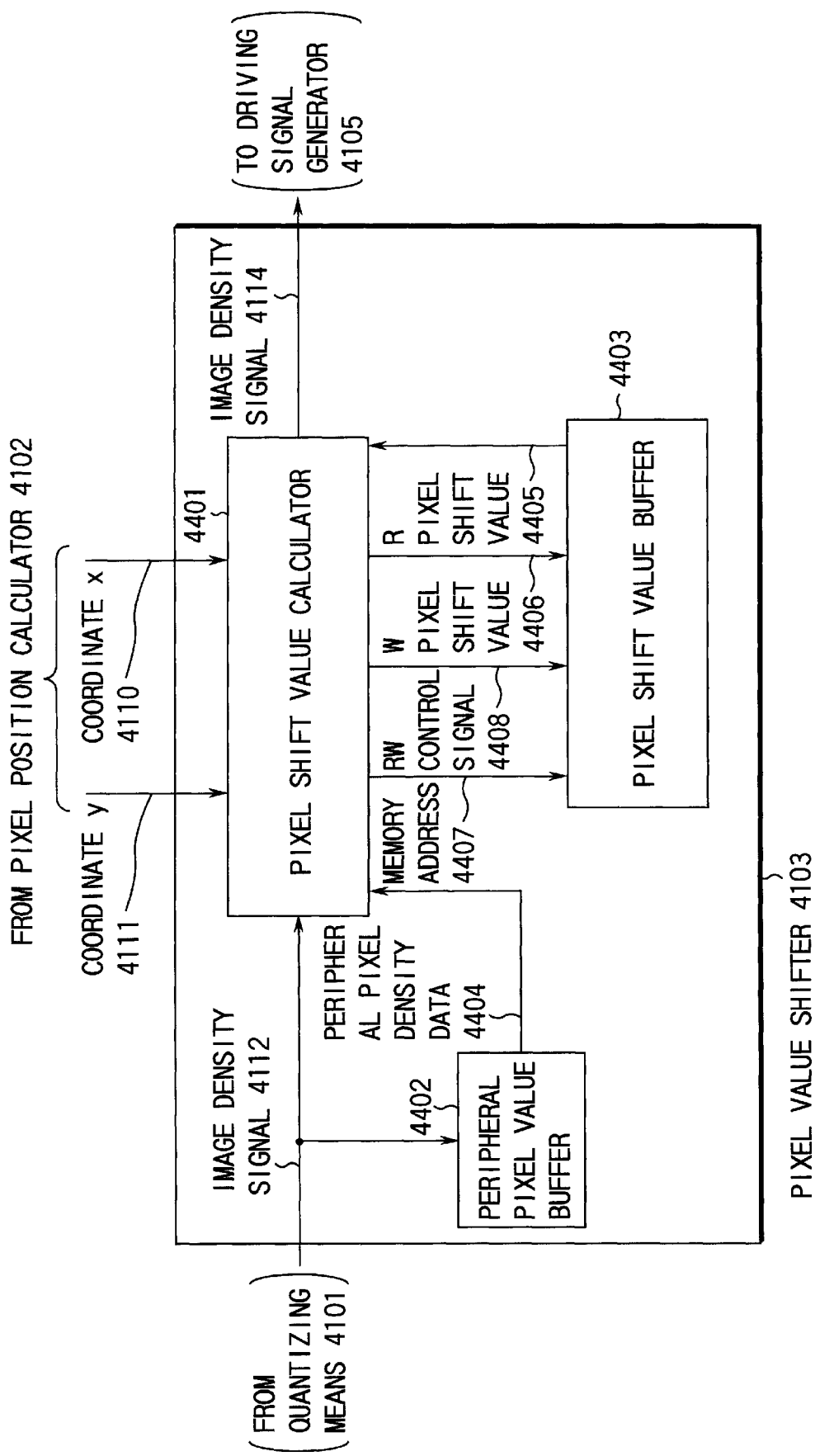
FIG. 7 is a block diagram showing the arrangement of a pixel value shifter.

FIG. 7 shows the arrangement of the pixel value shifter 4103. This pixel value shifter 4103 includes a pixel value shift value calculator 4401, a peripheral pixel value buffer 4402, and a pixel shift value buffer 4403.

When the quantized image density signal 4112 output from the quantizing means 4101 is supplied to the pixel value shifter 4103, this image density signal 4112 is input to the peripheral pixel value buffer 4402 in the pixel value shifter 4103. The peripheral pixel value buffer 4402 holds the image density signal 4112 and outputs the held signal as peripheral pixel density data 4404.

The pixel shift value calculator 4401 receives the peripheral pixel density data 4404 from the peripheral pixel value buffer 4402, the pixel density signal 4112 output from the quantizing means 4101, and an R pixel shift value 4405 for read, which is held in the pixel shift value buffer 4403 and corresponds to a pixel to be processed, and determines and outputs the image density signal 4114 to be supplied to the driving signal generator 4105 and a W pixel shift value 4406 for write to be supplied to the pixel shift value buffer 4403. Additionally, the pixel shift value calculator 4401 outputs to the pixel shift value buffer 4403 a memory address 4407 for reading out data from and writing data in the pixel shift value buffer 4403 and an RW control signal 4408 for controlling the read and write.

The peripheral pixel value buffer 4402 buffers the quantized image density signal 4112 of pixels to be processed sequentially supplied by using M (=predetermined number) flip-flops, and outputs the value buffered by each flip-flop as the peripheral pixel density data 4404.

The pixel shift value buffer 4403 is constructed of a memory, a memory read data bus, a memory write data bus, an address designator, and a memory RW (read/write) controller (none of them is shown).

If the RW control signal 4408 input to the memory RW controller indicates memory write, the address designator connects the memory of the address value memory address 4407 to the memory write data bus. Subsequently, the memory RW controller stores the W pixel shift value 4406 output from the pixel shift value calculator 4401 into the memory as a pixel shift value via the memory write data bus.

If the RW control signal 4408 input to the memory RW controller indicates memory read, the address designator connects the memory of the address value memory address 4407 to the memory read data bus. Subsequently, the memory RW controller outputs the pixel shift value stored in the memory to the pixel shift value calculator 4401 as the R pixel shift value 4405 via the memory read data bus.

Figure 8:
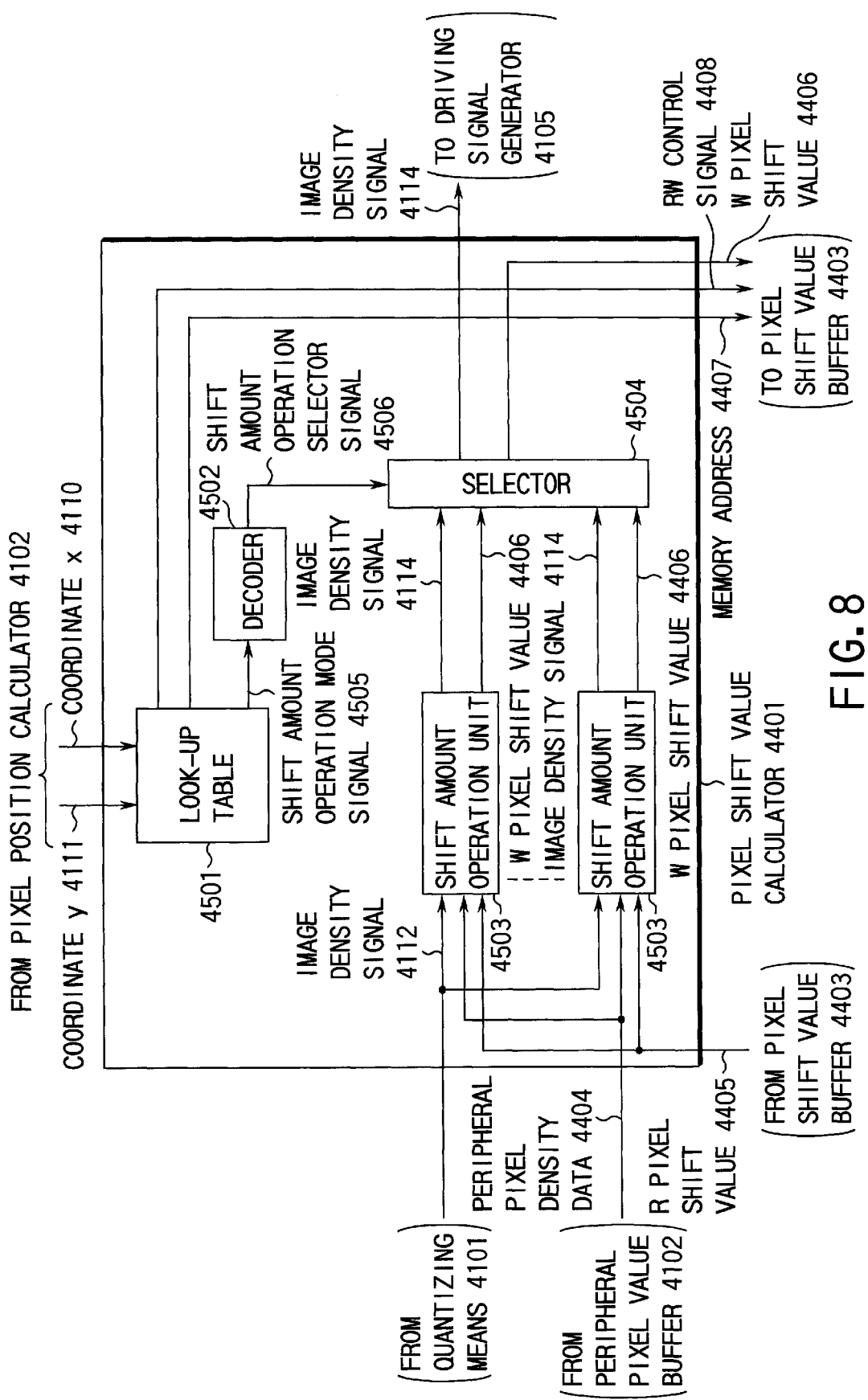
FIG. 8 is a block diagram showing the arrangement of a pixel shift value calculator.

FIG. 8 shows the configuration of the pixel shift value calculator 4401. This pixel shift value calculator 4401 comprises a look-up table 4501, a decoder 4502, a plurality of shift amount operation units 4503, and a selector 4504.

The look-up table 4501 receives the coordinate x 4110 in the main scan direction and the coordinate y 4111 in the sub-scan direction supplied from the pixel position calculator 4102, and outputs a shift amount operation mode signal 4505, the memory address 4407 of the pixel shift value buffer 4403, and the RW control signal 4408 as a memory read/write control signal.

The decoder 4502 decodes the shift amount operation mode signal 4505 from the look-up table 4501 and outputs a shift amount calculation selector signal 4506 to the selector 4504.

The selector 4504 selectively outputs the image density signals 4114 and the W pixel shift values 4406, as outputs from the shift amount operation units 4503, in accordance with the shift amount operation selector signal 4506 from the decoder 4504. By properly switching the outputs from the shift amount operation units 4503 (to be described below), the image density signal 4114 which clusters non-image portions of a plurality of pixels is obtained.

On the basis of the peripheral pixel density data 4404 from the peripheral pixel value buffer 4402, the output image density signal 4112 from the quantizing means 4101, and the pixel shift value (R pixel shift value 4405) corresponding to a pixel to be processed stored in the pixel shift value buffer 4403, the shift amount operation units 4503 output the image density signals 4114 of the pixel to be processed and the pixel shift values (W pixel shift values 4406) to the selector 4504 (shifting process).

The selector 4504 selectively outputs the shifted image density signal 4114 in accordance with the shift amount operation selector signal 4506 from the decoder 4502. The selector 4504 also outputs the W pixel shift value 4406 to the write data bus of the pixel shift value buffer 4403 storing the shift value of the shifted pixel to be processed.

The following five operations are examples of the shift amount operation units 4503:

1) Operation 1 (THRU)
2) Operation 2 (TAKEF)
3) Operation 3 (GIVEB)
4) Operation 4 (GIVEF)
5) Operation 5 (TAKEB)

Operation 1 directly outputs the image density signal 4112.

Operation 2 will be described below with reference to FIGS. 9A to 9D.

Figures 9A, 9B, 9C, 9D:
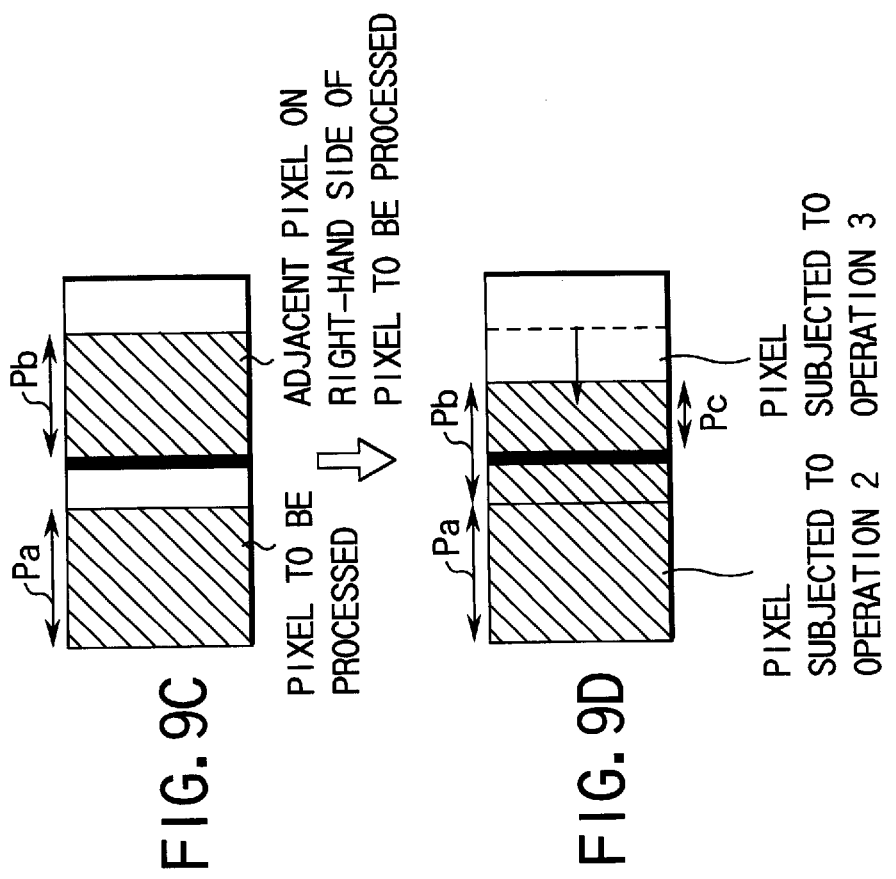
FIGS. 9A to 9D are views for explaining shift operations.

In FIGS. 9A and 9C, let Pa be the density data of a pixel to be processed and Pb be the density data of an adjacent pixel on the right-hand side of the pixel to be processed.

The shift operation of operation 2 is to add the value of Pb to the value of Pa. As shown in FIG. 9A, if the density of "Pa+Pb" is 100% or less, the image density signal 4114 of the pixel to be processed output after the shift operation is "Pa+Pb". Additionally, as the W pixel shift value 4406 corresponding to the adjacent pixel on the right-hand side, 0% is output to the pixel shift value buffer 4403. The pixel shift value buffer 4403 stores this W pixel shift value 4406 as a pixel shift value in a memory area corresponding to the adjacent pixel on the right-hand side of the pixel to be processed.

Consequently, as shown in FIG. 9B, the pixel (pixel to be processed) subjected to operation 2 contains "Pa+Pb" (density=100% or less).

If the density of "Pa+Pb" exceeds 100% as shown in FIG. 9C, the image density signal 4114 of the pixel to be processed output after the shift operation saturates, i.e., becomes 100%. Also, as the W pixel shift value 4406 corresponding to the adjacent pixel on the right-hand side, "W pixel shift value 4406=Pa+Pb−100%" is output to the pixel shift value buffer 4403.

Consequently, as shown in FIG. 9D, the density of the pixel (pixel to be processed) subjected to operation 2 becomes 100%.

Operation 3 will be similarly described below with reference to FIGS. 9A to 9D.

Operation 3 is performed for the adjacent pixel on the right-hand side subjected to the shift operation of operation 2. This operation 3 is to add an image density signal of a pixel to undergo a shift operation to an adjacent pixel value on the left-hand side. Let Pb be the density data of the pixel to be processed and Pa be the density data of the adjacent pixel on the left-hand side of the pixel to be processed.

As shown in FIG. 9A, if the density of "Pa+Pb" is 100% or less, the image density signal 4114 of the pixel to be processed output after the shift operation is 0%.

Consequently, as shown in FIG. 9B, the density of the pixel (adjacent pixel on the right-hand side of the pixel to be processed) subjected to operation 3 becomes "0%".

If the density of "Pa+Pb" exceeds 100% as shown in FIG. 9C, the output image density signal of the pixel to be processed is "Pa+Pb−100%". This value is already stored in the pixel shift value buffer 4403 when operation 2 is performed for the adjacent pixel on the left-hand side. Therefore, this value is read out as the R pixel shift value 4405.

Consequently, as shown in FIG. 9D, the density of the pixel (adjacent pixel on the right-hand side of the pixel to be processed) subjected to operation 3 becomes "Pa+Pb−100%" (=Pc).

Operation 4 will be described below with reference to FIGS. 10A to 10D.

In FIGS. 10A and 10C, let Pa be the density data of a pixel to be processed and Pb be the density data of an adjacent pixel on the right-hand side of the pixel to be processed.

The shift operation of operation 4 is to add the value of Pa to the value of Pb. As shown in FIG. 10A, if the density of "Pa+Pb" is 100% or less, the image density signal 4114 of the pixel to be processed output after the shift operation is 0%. Additionally, as the W pixel shift value 4406 corresponding to the adjacent pixel on the right-hand side, Pa is output to the pixel shift value buffer 4403. The pixel shift value buffer 4403 stores this W pixel shift value 4406 as a pixel shift value in a memory area corresponding to the adjacent pixel on the right-hand side of the pixel to be processed.

Consequently, as shown in FIG. 10B, the density of the pixel (pixel to be processed) subjected to operation 4 becomes 0%.

If the density of "Pa+Pb" exceeds 100% as shown in FIG. 10D, the image density signal 4114 of the pixel to be processed output after the shift operation is "image density signal 4114=Pa+Pb−100%". Also, as the W pixel shift value 4406 corresponding to the adjacent pixel on the right-hand side, "W pixel shift value 4406=100%−Pb" is output to the pixel shift value buffer 4403.

Consequently, as shown in FIG. 10D, the density of the pixel (pixel to be processed) subjected to operation 4 becomes "100%−Pb" (=PC).

Operation 5 will be similarly described below with reference to FIGS. 10A to 10D.

Operation 5 is performed for the adjacent pixel on the right-hand side subjected to the shift operation of operation 4. This operation 5 is to add the pixel value of an adjacent pixel on the left-hand side to an image density signal of a pixel to undergo the shift operation. Let Pb be the density data of the pixel to be processed and Pa be the density data of the adjacent pixel on the left-hand side of the pixel to be processed.

As shown in FIG. 10A, if the density of "Pa+Pb" is 100% or less, the image density signal 4114 of the pixel to be processed output after the shift operation is "Pa+Pb". Pa is already stored in the pixel shift value buffer 4403 when operation 4 is performed for the adjacent pixel on the left-hand side. Hence, this Pa is read out as the R pixel shift value 4405 and added to Pb to obtain the image density signal 4114.

Consequently, as shown in FIG. 10B, the pixel (adjacent pixel on the right-hand side of the pixel to be processed) subjected to operation 5 contains "Pa+Pb" (density=100% or less).

If the density of "Pa+Pb" exceeds 100% as shown in FIG. 10C, the image density signal 4114 of the pixel to be processed output after the shift operation is 100%. "100%−Pb" is already stored in the pixel shift value buffer 4403 when operation 4 is performed for the adjacent pixel on the left-hand side. Therefore, this value is read out as the R pixel shift value 4405 and added to Pb to obtain the image density signal 4114. In either case, the operation is realized by reading out a pixel shift value corresponding to the adjacent pixel on the left-hand side and adding the readout value to Pb.

Consequently, as shown in FIG. 10D, the density of the pixel (adjacent pixel on the right-hand side of the pixel to be processed) subjected to operation 5 becomes 100%.

Figures 11A, 11B, 12:
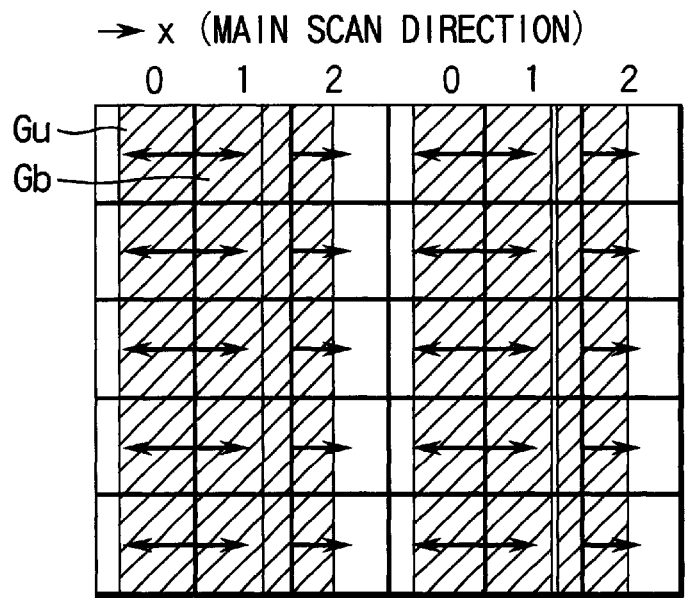
FIGS. 11A and 11B are views showing the correspondence between shift operations and reference positions in a vertical three-pixel line structure (line pattern)
FIG. 12 is a view for explaining the vertical three-pixel line structure.

FIGS. 11A and 11B are views for explaining one example of the operation of the pixel shifter 4103 and the reference position signal generator 4104 in the second halftone processing means 4004.

FIG. 11A shows the correspondence of the types of shift operations to the two-dimensional positions (x,y) of pixels. FIG. 11B shows the correspondence of reference positions to the two-dimensional positions (x,y) of pixels.

The two-dimensional position of a pixel means the coordinate x 4110 in the main scan direction and the coordinate y 4111 in the sub-scan direction output from the pixel position calculator 4102. x%3 is the remainder when the coordinate x in the main scan direction of a pixel to be processed is divided by 3. The same notation will be used hereinafter.

FIG. 12 shows the output pattern (recording device driving signal 4115) from the second halftone processing means 4004 when the operation shown in FIGS. 11A and 11B is performed. Non-image portions are collected in the main scan direction and appear at a period of three pixels or more in the main scan direction, thereby forming a so-called vertical three-pixel line structure (line pattern).

For example, three upper-left pixels Ga, Gb, and Gc correspond to pixel numbers "0", "1", and "2" in this order from the left. Accordingly, the pixel Ga corresponds to pixel number "0", the shift operation is "operation 1", and the reference position is "right". The pixel Gb corresponds to pixel number "1", the shift operation is "operation 2", and the reference position is "left". The pixel Gc corresponds to pixel number "2", the shift operation is "operation 3", and the reference position is "left".

As a consequence, for the pixel Ga the image density signal 4112 is directly output on the basis of the reference position "right". In this output pattern, a non-image portion is positioned on the left-hand side, and an image portion on the right-hand side.

For the pixel Gb, operation 2 shown in FIGS. 9C and 9D is performed. For the pixel Gc, operation 3 shown in FIGS. 9C and 9D is performed. As shown in FIG. 9D, the output pattern of the pixel Gb has a 100% image portion. In the output pattern of the pixel Gc, an image portion is positioned on the left-hand side, and a non-image portion on the right-hand side. Consequently, non-image portions are clustered on the right-hand side of the pixel Gc.

Referring to FIG. 12, the other three pixels have output patterns analogous to those of the pixels Ga, Gb, and Gc described above.

FIGS. 13A and 13B show one example of the operation of the pixel value shifter 4103 and the reference position signal generator 4104 in the second halftone processing means 4004. FIG. 14 shows the output pattern (recording device driving signal 4115) from the second halftone processing means 4004 when this operation is performed. In this operation, the period in the main scan direction of non-image portions is constant, and the initial phase changes each time scan is performed. A non-image portion in the main scan direction forms a screen angle of 63° and appears at a "period of three pixels×sin63°" or more, thereby forming a so-called oblique three-pixel-modulated line structure.

For example, three left pixels G0, G1, and G2 in the first row correspond to pixel numbers "0,0", "1,0", and "2,0" in this order from the left. Accordingly, for the pixel G0, the shift operation is "operation 1", and the reference position is "right". For the pixel G1, the shift operation is "operation 2", and the reference position is "left". For the pixel G2, the shift operation is "operation 3", and the reference position is "left".

If this is the case, output patterns are analogous to those of the pixels Ga, Gb, and Gc shown in FIG. 12. Also, three other pixels in the same row have similar output patterns.

Three left pixels G3, G4, and G5 in the second row correspond to pixel numbers "0,1", "1,1", and "2,1", respectively. Accordingly, for the pixel G3, the shift operation is ",operation 4", and the reference position is "right". For the pixel G4, the shift operation is "operation 5", and the reference position is "right". For the pixel G5, the shift operation is "operation 1", and the reference position is "left".

As a consequence, operation 4 shown in FIGS. 10C and 10D is performed for the pixel G3, and operation 4 shown in FIGS. 10C and 10D for the pixel G4. As shown in FIG. 10D, the output pattern of the pixel G4 has a 100% image portion. In the output pattern of the pixel G3, a non-image portion is positioned on the left-hand side, and an image portion on the right-hand side. In this manner, non-image portions are clustered on the left-hand side of the pixel G3.

For the pixel G5, the image density signal 4112 is directly output on the basis of the reference position "left". In this output pattern, an image portion is positioned on the left-hand side, and a non-image portion on the right-hand side.

Referring to FIG. 14, three other pixels in the same row have output patterns similar to those of the pixels Ga, Gb, and Gc described above.

In the third row, output patterns are formed on the basis of a pixel of "operation 3" and the reference position "left", a pixel of "operation 1" and the reference position "right", and a pixel of "operation 2" and the reference position "left".

In the fourth row, output patterns are formed on the basis of a pixel of "operation 1" and the reference position "left", a pixel of "operation 4" and the reference position "right", and a pixel of "operation 5" and the reference position "right".

In the fifth row, output patterns are formed on the basis of a pixel of "operation 2" and the reference position "left", a pixel of "operation 3" and the reference position "left", and a pixel of "operation 1" and the reference position "right".

In the sixth row, output patterns are formed on the basis of a pixel of "operation 5" and the reference position "left", a pixel of "operation 11" and the reference position "left", and a pixel of "operation 4" and the reference position "right".

As described above, the second halftone processing means 4004 shown in FIG. 4 can cluster non-image portions of a plurality of pixels by diverse methods. For the sake of simplicity of explanation, this embodiment will be described by taking a vertical three-pixel line structure as an example.

Figure 15:
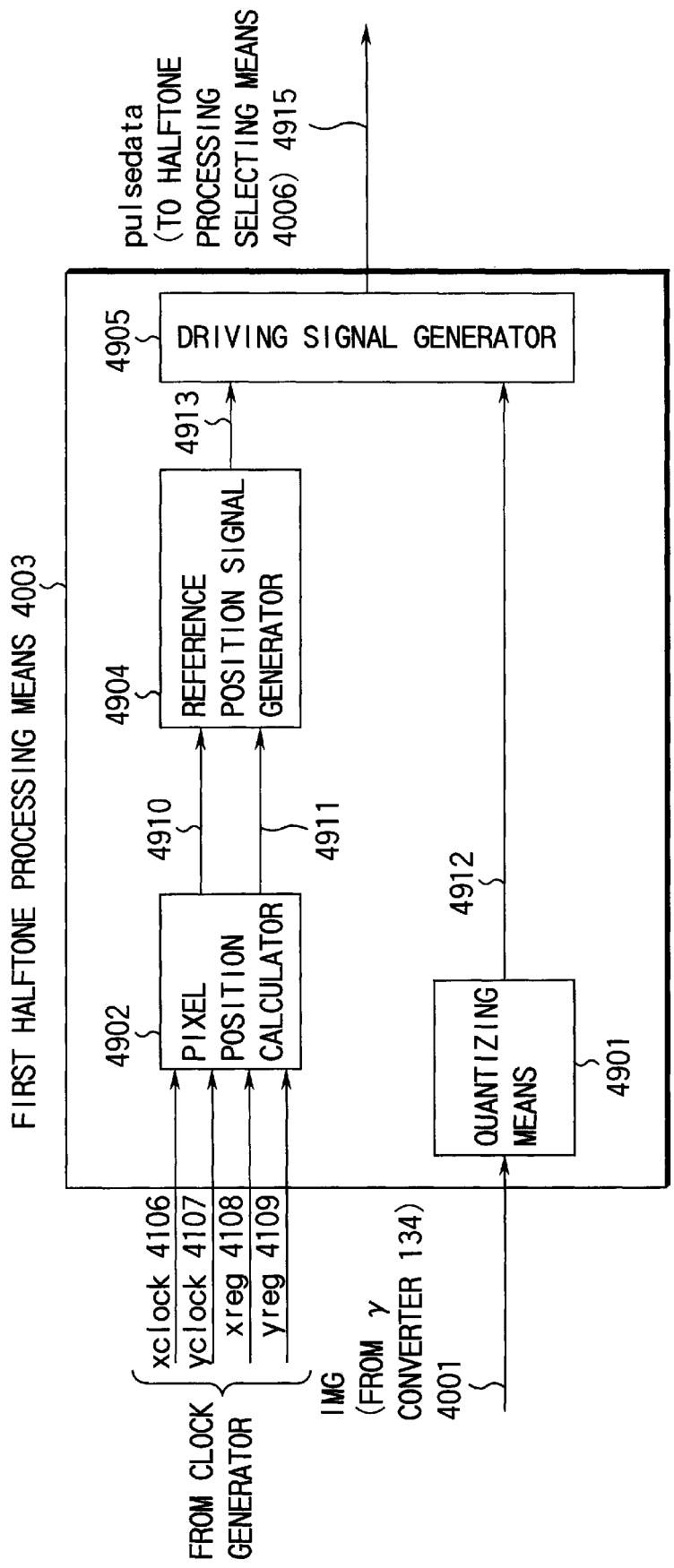
FIG. 15 is a block diagram showing the arrangement of a halftone processing means.

FIG. 15 shows the configuration of the first halftone processing means 4003. This first halftone processing means comprises quantizing means 4901, a pixel position calculator 4902, a reference position signal generator 4904, and a driving signal generator 4905.

The pixel position calculator 4902 calculates the pixel position of a signal currently being processed, on the basis of the register set values xreg 4108 and yreg 4109 supplied from the clock generator (not shown), the clock signal xclock 4106 in the main scan direction, and the clock signal yclock 4107 in the sub-scan direction, and generates coordinate information x 4910 in the main scan direction and coordinate information y 4911 in the sub-scan direction. The arrangement of this pixel position calculator 4902 is the same as the arrangement of the pixel position calculator 4102 of the second halftone processing means 4004 shown in FIG. 6, so a detailed description thereof will be omitted.

The reference position signal generator 4904 generates a reference position signal 4913 from the coordinate information x 4910 in the main scan direction and the coordinate information y 4911 in the sub-scan direction supplied from the pixel position calculator 4902. The arrangement of this reference position signal generator 4904 is the same as in the second halftone processing means 4004, so a detailed description thereof will be omitted.

The quantizing means 4901 quantizes the input image signal IMG 4001 from the γ converter 134 in accordance with a predetermined threshold value, and outputs as an image density signal 4912.

The driving signal generator 4905 outputs a recording device driving signal 4915 on the basis of the reference position signal from the reference position signal generator 4904 and the image density signal 4912 of a pixel to be processed from the quantizing means 4901. In pulse width modulation type laser recording electrophotography, this recording device driving signal 4915 is a laser driving pulse signal, and a laser emits light when the pulse is ON.

FIG. 16 shows an example of the operation of the reference position signal generator 4904 in terms of the correspondence between the two-dimensional position (x,y) of a pixel and the reference position. FIG. 17 shows the output pattern (recording device driving signal 4915) from the first halftone processing means 4003 when the operation shown in FIG. 16 is performed. This output pattern is a so-called vertical one-pixel line structure.

For example, each pixel corresponds to pixel number "0", and the reference position is "left".

As a consequence, the image density signal 4112 is directly output for each pixel on the basis of the reference position "left". In this output pattern, therefore, an image portion is positioned on the left-hand side, and a non-image portion on the right-hand side.

The halftone processing selecting means 4006 is a selector which operates by the halftone processing selecting signal (Si) 4005 output from the high density selecting means 4002. If the halftone processing selecting signal Si is "0", the halftone processing selecting means 4006 outputs the recording device driving signal 4915 output from the first halftone processing means 4003 to the printer 2 as a recording device driving signal 4007. If the halftone processing selecting signal S1 is "2", the halftone processing selecting means 4006 outputs the recording device driving signal 4115 output from the halftone processing means 4915 to the printer 2 as the recording device driving signal 4007.

That is, the halftone processor 135 is an adaptive gray level processing means which performs halftone processing by the first halftone processing means 4003 if the image signal IMG 4001 is smaller than the threshold value Th1, and performs halftone processing by the second halftone processing means 4004 if the image signal IMG 4001 is equal to or larger than the threshold value Th1.

Figure 18A:
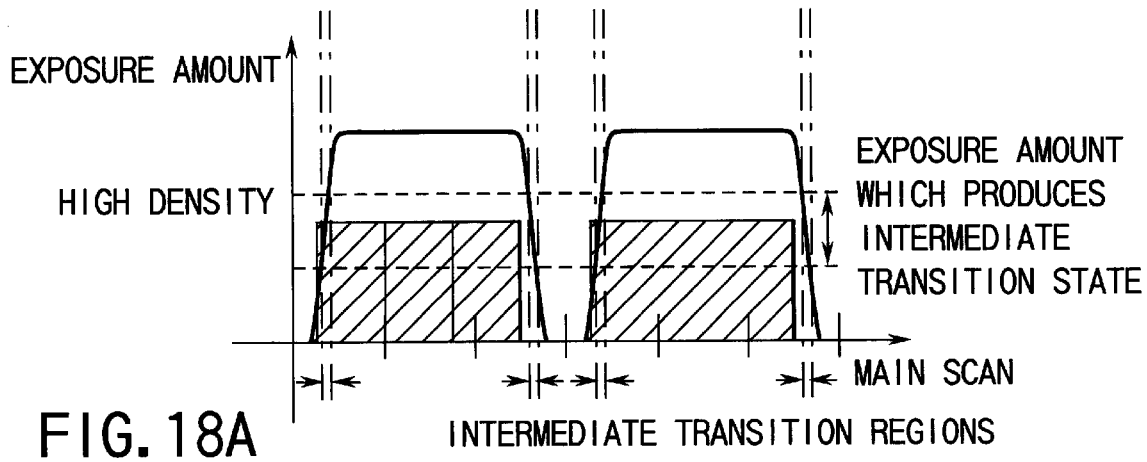
FIGS. 18A and 18B are views showing exposure distributions in a main scan direction when the second halftone processing means for clustering non-image portions of a plurality of pixels performs gray level processing.

FIG. 18A is a sectional view in the main scan direction of an exposure distribution when laser driving is done by the recording device driving signal (laser driving pulse signal) 4915 output from the second halftone processing means 4004 when the image signal 4001 has high density.

Figure 18B:
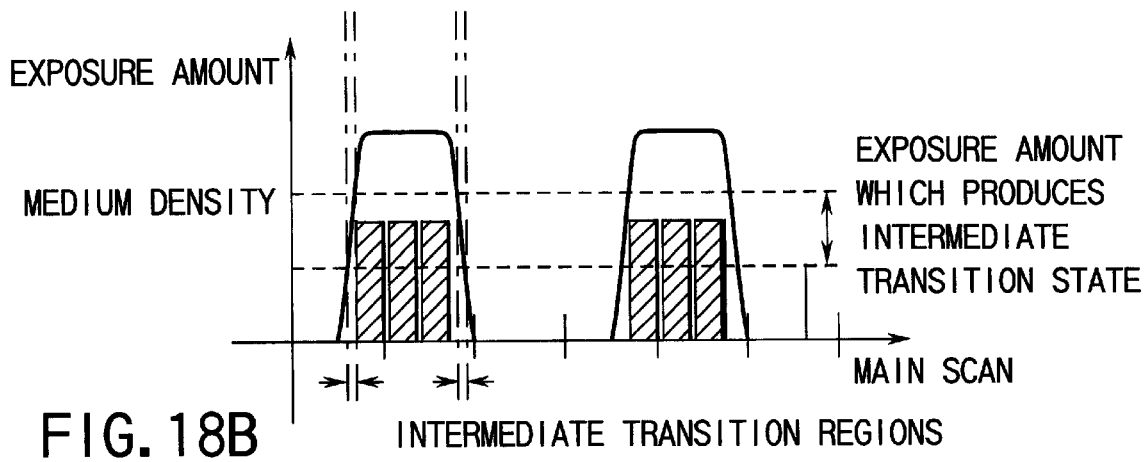

FIG. 18B is a sectional view in the main scan direction of an exposure distribution when laser driving is done by the recording device driving signal 4915 output from the second halftone processing means 4004 when the image signal 4001 has medium density.

Figure 19A:
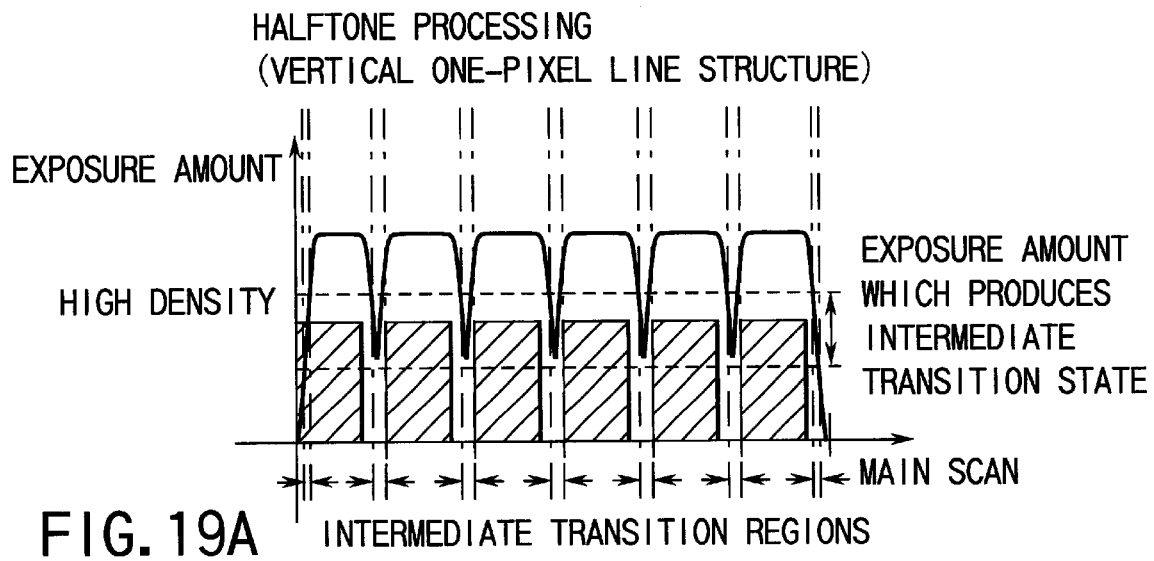
FIGS. 19A and 19B are views showing exposure distributions in the main scan direction when the halftone processing means performs gray level processing.

FIG. 19A is a sectional view in the main scan direction of an exposure distribution when laser driving is done by the output recording device driving signal from the first halftone processing means 4003 when the image signal 4001 has high density.

Figure 19B:
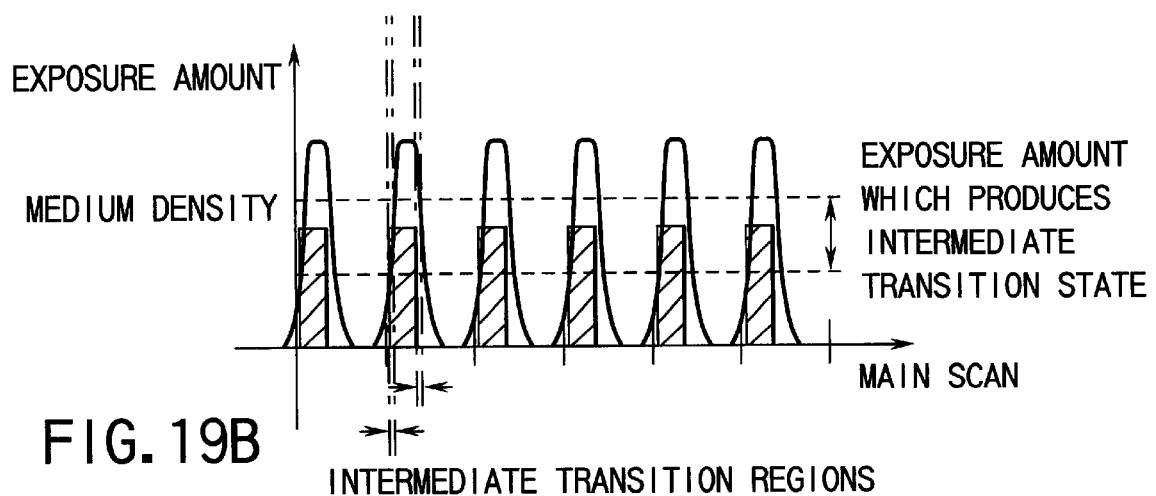

FIG. 19B is a sectional view in the main scan direction of an exposure distribution when laser driving is done by the output recording device driving signal from the first halftone processing means 4003 when the image signal 4001 has medium density.

As shown in FIG. 19A, in the exposure distribution of the first halftone processing means 4003 when the image signal 4001 has high density, a large number of intermediate transition regions at exposure levels at which toner adhesion is unstable form owing to the influence of adjacent ON pulses. In this case of FIG. 19A, these intermediate transition regions continuously connect with stably developed regions, so originally non-image portions can become excessively dark to form solid portions. This interferes with stable reproduction. In the exposure distribution of the second halftone processing means 4004, on the other hand, as shown in FIG. 18A, the OFF state of pulses corresponding to non-image portions continues long, so the number of intermediate transition regions is small. Therefore, high-density portions are stably reproduced despite the presence of variations in the environment and the like.

As shown in FIG. 19B, in the exposure distribution of the first halftone processing means 4003 when the image signal 4001 has medium density, the number of intermediate transition regions is smaller than when the density is high, so variations of reproduction due to environmental variations are negligible. Also, when compared to the second halftone processing means 4004 shown in FIG. 18B, the pixel arrangement has high period and high resolution and hence does not easily produce visual noise.

That is, for an image having density equal to or larger than a predetermined threshold value, the halftone processor 135 of this invention clusters non-image portions of a plurality of pixels and thereby reduces intermediate transition regions and realizes stable reproduction. For an image density signal having density smaller than the threshold value, the halftone processor 135 improves the image quality by using halftoning with higher resolution.

In the above first embodiment, the quantizing means 4101 and 4901 are used in the first halftone processing means 4003 and the second halftone processing means 4004. However, these quantizing means can also be replaced with image density converting means in accordance with the characteristics of the printer 2.

In this first embodiment, the halftone processor 135 is applied to a copying machine. However, this halftone processor 135 is also usable as a gray level processing means of a printer.

Figure 20:
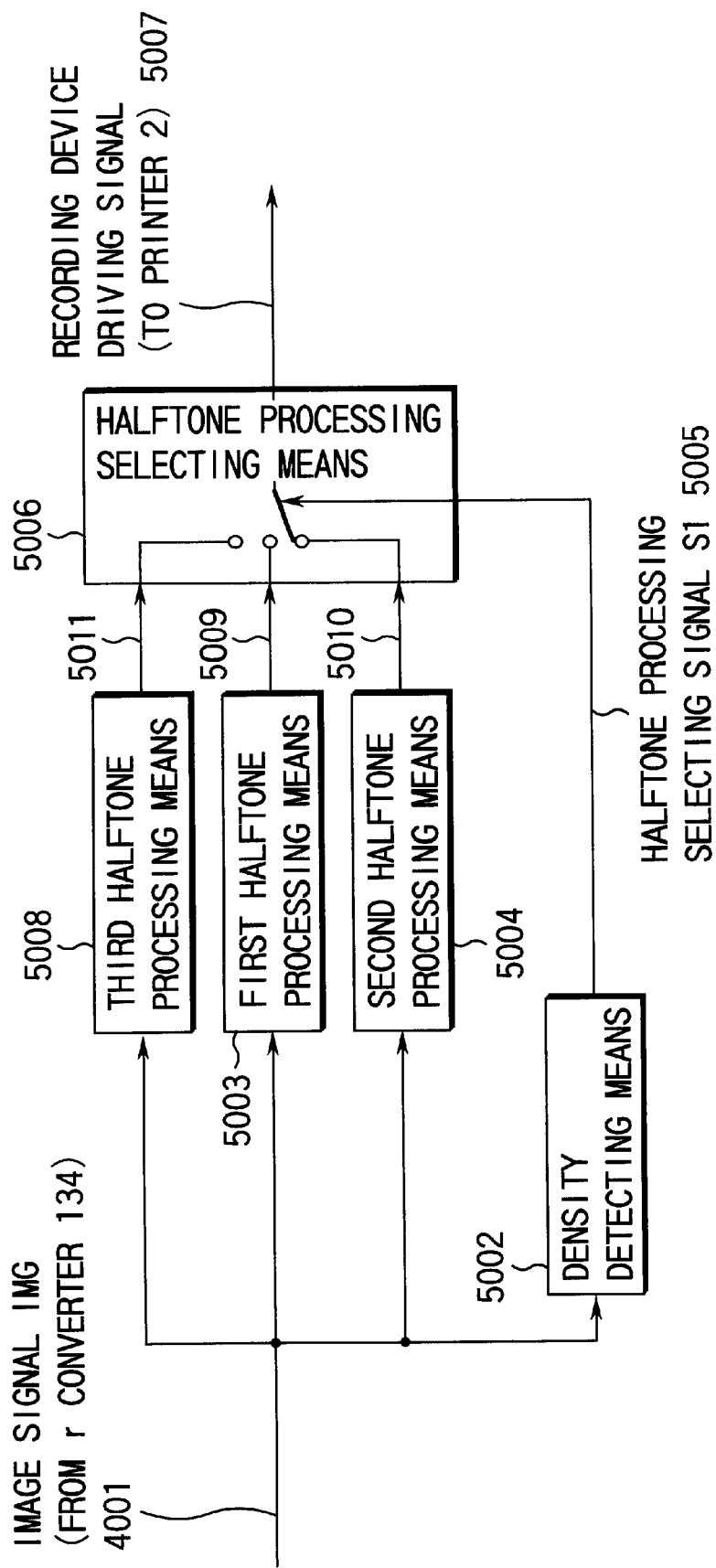
FIG. 20 is a block diagram showing an outline of the arrangement of the second embodiment of the halftone processor.

FIG. 20 shows an outline of the arrangement of the second embodiment of a halftone processor 135 as the core of the present invention. This halftone processor 135 comprises a density detecting means 5002, a first halftone processing means 5003, a second halftone processing means 5004, a halftone processing selecting means 5006, and a third halftone processing means 5008.

The configurations of the first halftone processing means 5003, the second halftone processing means 5004, and the halftone processing selecting means 5006 are the same as the first halftone processing means 4003, the second halftone processing means 4004, and the halftone processing selecting means 4006 shown in FIG. 4, so a detailed description thereof will be omitted.

The density detecting means 5002 compares predetermined density values Th1 and Th2 with an image signal IMG 4001 from a γ converter 134, and determines a halftone processing selecting signal (S1) 5005 as per.

$S1=0\ IMG<Th1$ $S1=1\ Th1 \leq IMG < Th2$ $S1=2\ IMG \geq Th2$

The configuration of the third halftone processing means 5008 for clustering image portions of a plurality of pixels is the same as the second halftone processing means 4004 shown in FIG. 4, so a detailed description thereof will be omitted.

Figures 21A, 21B, 22:
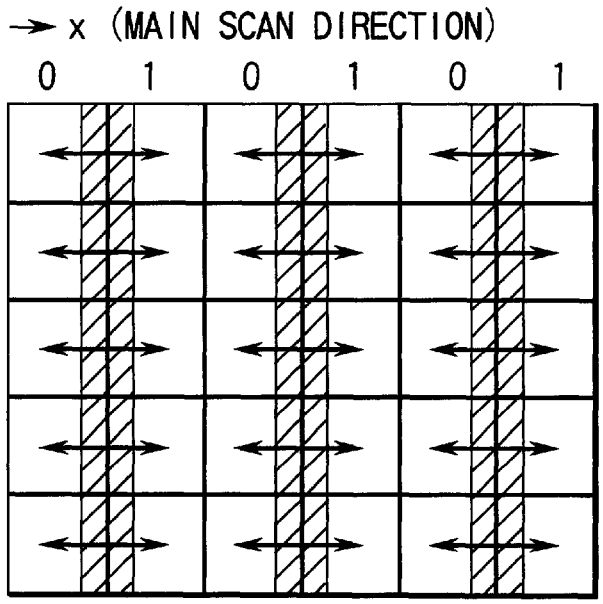
FIGS. 21A and 21B are views showing the correspondence between shift operations and reference positions in a vertical two-pixel line structure.
FIG. 22 is a view for explaining the vertical two-pixel line structure.

FIGS. 21A and 21B show an example of the operation of a pixel value shifter 4103 and a reference position signal generator 4104 in the third halftone processing means 5008, in terms of the correspondence between the two-dimensional positions (x,y) of pixels, shift operations, and reference positions.

FIG. 22 shows an output pattern (recording device driving signal 5011) from the third halftone processing means 5008 when the operation shown in FIGS. 21A and 21B is performed. This output pattern has a so-called vertical two-pixel line structure in which image portions are clustered in the main scan direction and appear at a period of two pixels or more in the main scan direction.

For example, two pixels Gd and Ge correspond to pixel numbers "0" and "1" in this order from the left. Accordingly, the pixel Gd corresponds to pixel number "0", the shift operation is "operation 1", and the reference position is "right". The pixel Ge corresponds to pixel number "1", the shift operation is "operation 1", and the reference position is "left".

As a consequence, for the pixel Gd an image density signal 4112 is directly output on the basis of the reference position "right". In this output pattern, therefore, a non-image portion is positioned on the left-hand side, and an image portion on the right-hand side.

For the pixel Ge, the image density signal 4112 is directly output on the basis of the reference position "left". In this output pattern, therefore, an image portion is positioned on the left-hand side, and a non-image portion on the right-hand side. Consequently, image portions of the pixels Gd and Ge are clustered.

In the exposure distribution of the third halftone processing means 5008, the ON state of pulses corresponding to image portions continues long. So, intermediate transition regions can be reduced at low density. Accordingly, although the resolution deteriorates, low-density portions are stably reproduced against variations in the environment and the like.

The halftone processing selecting means 5006 is a selector which operates by the halftone processing selecting signal (S1) 5005 output from the density detecting means 5002.

If the halftone processing selecting signal S1 is "0", the halftone processing selecting means 5006 outputs the recording device driving signal 5011 output from the third halftone processing means 5008 to a printer 2 as a recording device driving signal 5007.

If the halftone processing selecting signal Si is "1", the halftone processing selecting means 5006 outputs a recording device driving signal 5009 output from the halftone processing means 5002 to the printer 2 as the recording device driving signal 5007.

If the halftone processing selecting signal S1 is "2", the halftone processing selecting means 5006 outputs a recording device driving signal 5010 output from the second halftone processing means 5004 to the printer 2 as the recording device driving signal 5007.

That is, this halftone processor 135 is an adaptive gray level processing means; the halftone processor 135 processes halftone by the third halftone processing means 5008 if the image signal IMG 4001 is smaller than the threshold value Th1, by the first halftone processing means 5003 if the image signal IMG 4001 is equal to or larger than the threshold value Th1 and smaller than the threshold value Th2, and by the second halftone processing means 5004 if the image signal IMG 4001 is equal to or larger than the threshold value Th2.

Stable tone reproduction processing for high-density portions of the present invention is summarized as follows. For an image signal whose density is equal to or larger than the predetermined threshold value Th1, non-image portions of a plurality of pixels are clustered to reduce intermediate transition regions, thereby achieving stable reproduction. For an image signal whose density is smaller than the predetermined threshold value Th1, image portions of a plurality of pixels are clustered to reduce intermediate transition regions, thereby achieving stable reproduction. For an image density signal having medium density equal to or larger than the threshold value Th1 and smaller than Th2, halftone processing having higher resolution is used to improve the image quality.

In the above embodiment, quantizing means are used in the first halftone processing means 5003, the second halftone processing means 5004, and the third halftone processing means 5008 for clustering image portions of a plurality of pixels. However, these quantizing means can also be replaced with image density converting means in accordance with the characteristics of the printer 2.

Figure 23:
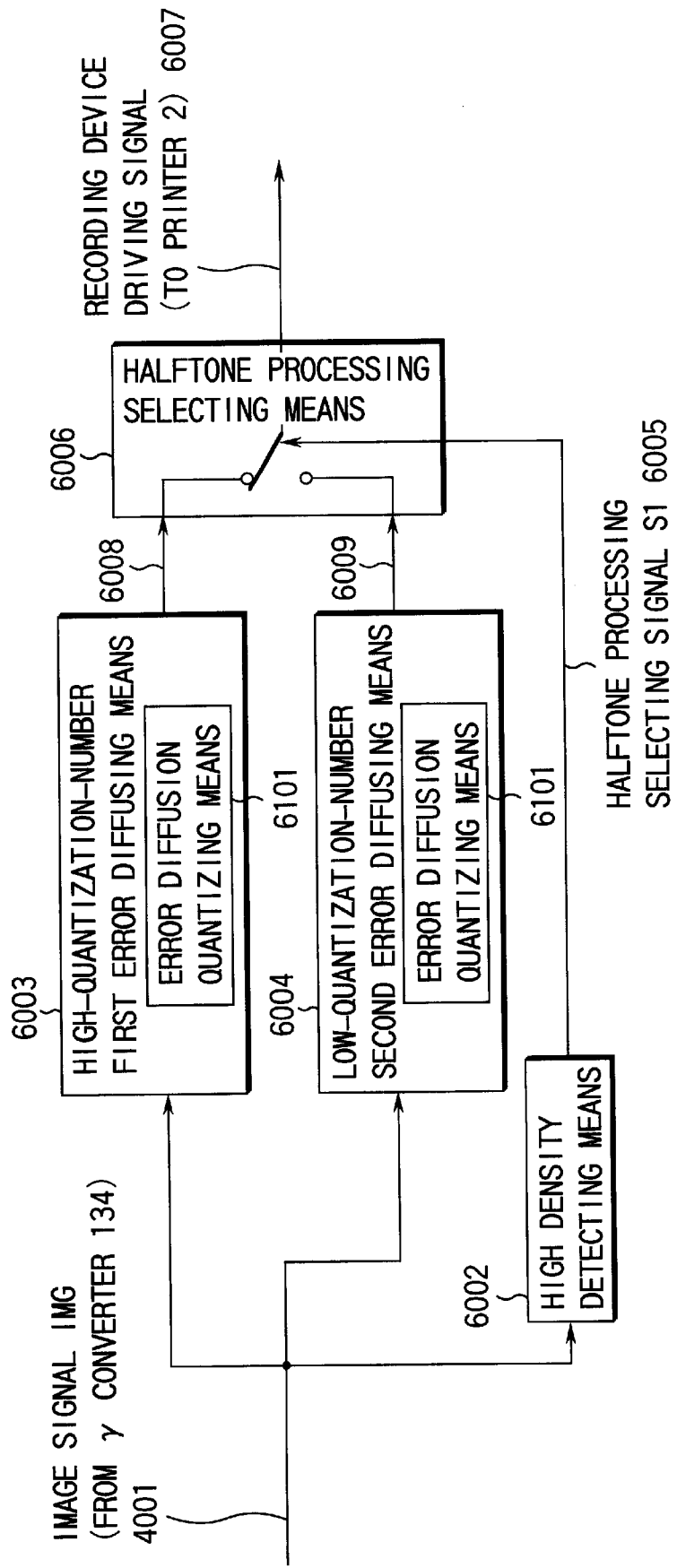
FIG. 23 is a block diagram showing an outline of the arrangement of third embodiment of the halftone processor.

FIG. 23 shows an outline of the arrangement of the third embodiment of a halftone processor 135 as the core of the present invention. This halftone processor 135 comprises a density detecting means 6002, a high-quantization-number first error diffusing means 6003, a low-quantization-number second error diffusing means 6004, and a halftone processing selecting means 6006.

The density detecting means 6002 is the same as the density detecting means 5002 shown in FIG. 20, so a detailed description thereof will be omitted.

Figure 24:
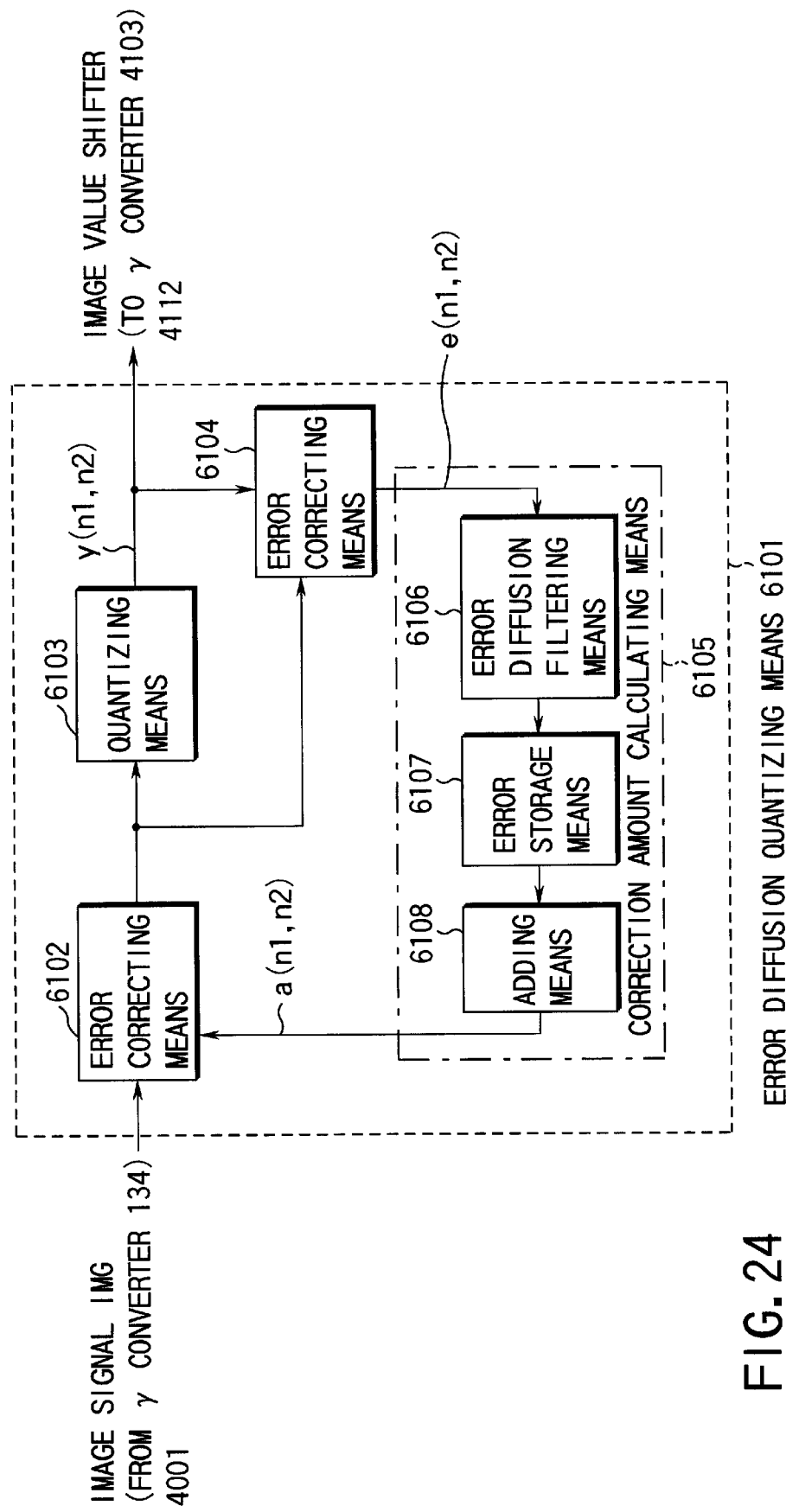
FIG. 24 is a block diagram showing the arrangement of an error diffusion quantizing means.

The configurations of the first error diffusing means 6003 and the second error diffusing means 6004 are the same as replacing the quantizing means 4101 in the configuration of the second halftone processing means 4004 shown in FIG. 4 with an error diffusion quantizing means 6101 shown in FIG. 24. For the sake of simplicity of explanation, this error diffusion quantizing means 6101 will be described below, and a description of the rest will be omitted.

FIG. 24 schematically shows the arrangement of the error diffusion quantizing means 6101. This error diffusion quantizing means 6101 comprises an error correcting means 6102, a quantizing means 6103, an error calculating means 6104, and a correction amount calculating means 6105.

The correction amount calculating means 6105 is composed of an error diffusion filtering means 6106 and an error storage means 6107.

An image signal IMG(n1,n2) as an object of quantization is externally input to the error diffusion quantizing means 6101. This IMG(n1,n2) represents an image signal having an x coordinate n1 in a main scan direction and a γ coordinate n2 in a sub-scan direction. The same notation is used for other factors. The error correcting means 6102 adds a correction amount a(n1,n2), previously calculated by the correction amount calculating means 6105, and IMG(n1,n2), and outputs the sum to the quantizing means 6103. The quantizing means 6103 quantizes this value in accordance with predetermined threshold values and outputs a quantization level y(n1,n2)

$$y(n1, n2) = \text{Quantization}(IMG(n1, n2) + a(n1, n2))$$

The quantization number is determined by the number of these threshold values.

The error calculating means 6104 calculates an error e(n1,n2).

$$e(n1, n2)=y(n1, n2)-(IMG(n1, n2)+a(n1, n2))$$

The error diffusion filtering means 6106 and the error storage means 6107 calculate a correction amount m(i,j) ($-Ni \leq i \leq Ni$, $0 \leq j \leq Nj$) of the error storage means 6107 given by $$m(i, j)=g(i, j) \times e(n1, n2)$$

Where Ni and Nj are constants that determine the size of the filter.

For example, if the error diffusion filtering means 6106 has a jarvis filter coefficient, it is $$g(-1, 0)=0, g(0, 0)=0, g(1, 0)=7/16$$

$$g(-1, 1)=3/16, g(0, 1)=5/16$$

$$g(1, 1)=1/16$$

for Ni=1 and Nj=1. An adding means 6108 adds the above correction amount generated whenever one pixel is processed to a total correction amount M(i,j) for each m(i,j), that is $$M(i, j)=M(i, j)+m(i, j)$$

The correction amount a is determined by $$a(n1+i, n2+j)=M(i, j)$$

$$-Ni \leq i \leq Ni, 0 \leq j \leq Nj$$

The error diffusion process is done by the above operation, and quantization is performed.

The first error diffusing means 6003 and the second error diffusing means 6004 differ only in the quantization number of the quantizing means 6103. FIG. 25 shows set threshold values of the two error diffusing means when, for example, the high quantization number is four valued and the low quantization number is two. Assume that inputs and outputs are composed of 8 bits and expressed in hexadecimal notation.

FIGS. 26A and 26B show the output patterns (recording device driving signals) from the first error diffusing means 6003 (four-valued error diffusion) and the second error diffusing means 6004 (two-valued error diffusion), respectively, in a high-density portion (reflectance= approximately 83%). Note that all reference position signals are "left" and all shift operations are "operation 1".

In the first error diffusing means 6003, the quantization number is large, so fine non-image portions appear, and the distribution of these non-image portions has a short period. This increases intermediate transition regions and makes the reproduction of a high-density portion unstable.

In the second error diffusing means 6004, the quantization number is small, so a minimum region of non-image portions is equivalent to one pixel, and the distribution of these non-image portions has a longer period than in the case of high quantization number. This reduces intermediate transition regions and makes the reproduction of a high-density portion stable.

Also, an output minimum pixel structure from the first error diffusing means 6003 is a pulse which is equal to or smaller than a sub-pixel. An output minimum pixel structure from the second error diffusing means 6004 is a pulse which is equal to or larger than one pixel. Therefore, at low densities the second error diffusing means 6004 can reproduce images more stably.

The halftone processing selecting means 6006 is a selector which operates by a halftone processing selecting signal (S1) 6005 output from the density detecting means 6002.

If the halftone processing selecting signal Si is "0", the halftone processing selecting means 6006 outputs a recording device driving signal 6009 output from the second error diffusing means 6004 to a printer 2 as a recording device driving signal 6007.

If the halftone processing selecting signal S1 is "1", the halftone processing selecting means 6006 outputs a recording device driving signal 6008 output from the first error diffusing means 6003 to the printer 2 as the recording device driving signal 6007.

If the halftone processing selecting signal Si is "2", the halftone processing selecting means 6006 outputs the recording device driving signal 6009 output from the second error diffusing means 6004 to the printer 2 as the recording device driving signal 6007.

That is, the halftone processor 135 is an adaptive gray level processing means; the halftone processor 135 processes halftone by the second error diffusing means 6004 if the image signal IMG 4001 is smaller than a threshold value T1h, by the first error diffusing means 6003 if the image signal IMG 4001 is equal to or larger than the threshold value Th1 and smaller than a threshold value Th2, and by the second error diffusing means 6004 if the image signal IMG 4001 is equal to or larger than the threshold value Th2.

For an image signal whose density is equal to or larger than the predetermined threshold value Th2, the halftone processor 135 of this third embodiment clusters non-image portions of a plurality of pixels by the second error diffusing means 6004, thereby reducing intermediate transition regions and stably reproducing the image. For an image signal whose density is smaller than the predetermined threshold value Th1, the halftone processor 135 clusters image portions of a plurality of pixels by the second error diffusing means 6004, thereby reducing intermediate transition regions and stably reproducing the image. For an image density signal having medium density which is equal to or larger than the threshold value Th1 and smaller than Th2, the halftone processor 135 improves the image quality by using the first error diffusing means 6003 having higher resolution.

In the above third embodiment, it is also possible to further reduce intermediate transition regions and improve stable reproduction by generating a reference position signal which, as shown in FIG. 13, periodically changes in the main scan direction and the sub-scan direction, in the reference position signal generator 4104 and the like. When the changes of this reference position signal are constant in the main scan direction and the sub-scan direction, this arrangement can be realized by a flip-flop and a simple sequential circuit.

Furthermore, the third embodiment shown in FIG. 23 is applicable to power modulation type laser recording electrophotography by removing the reference position signal generator.

Figure 27:
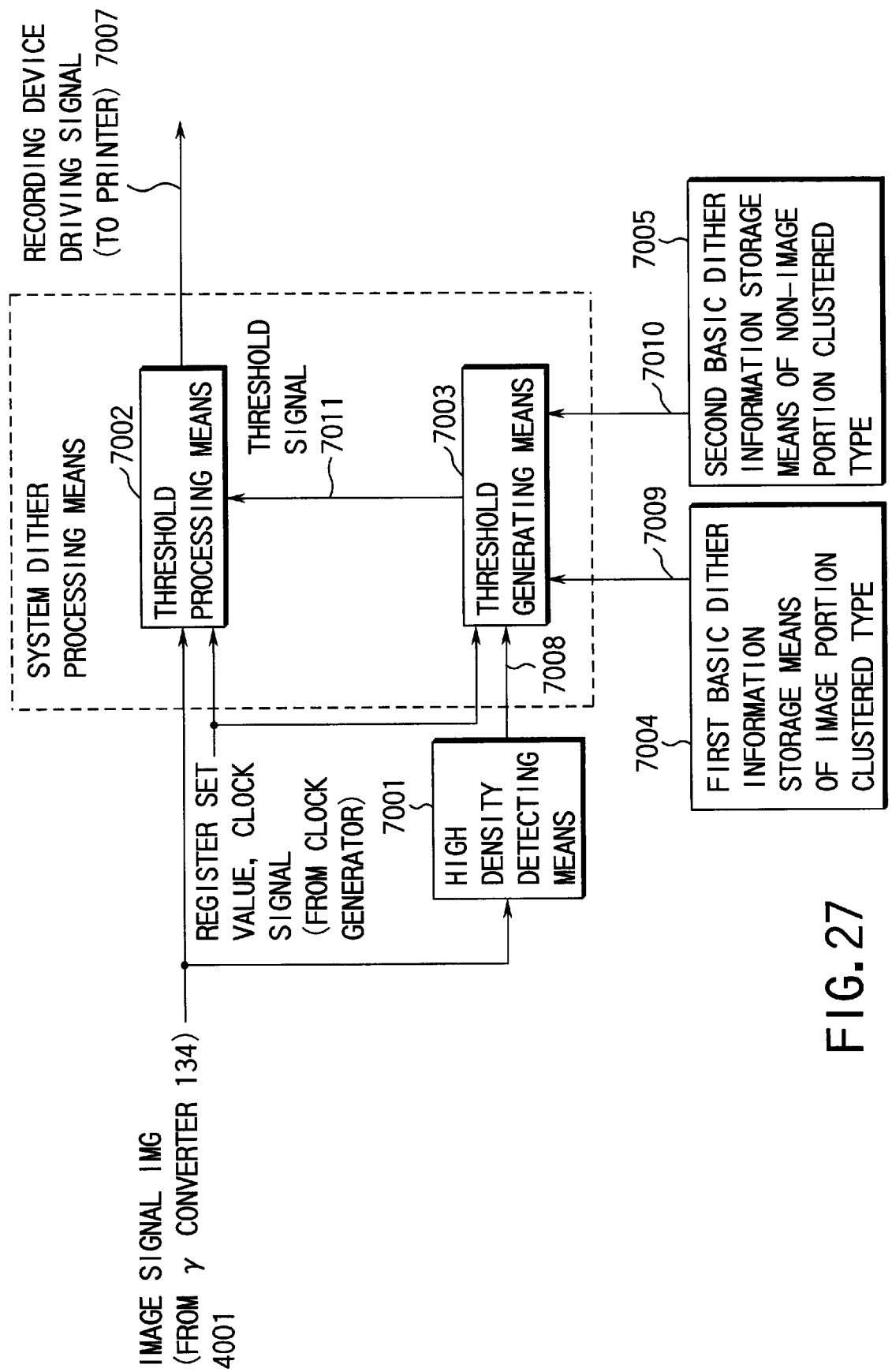
FIG. 27 is a block diagram showing an outline of the arrangement of the fourth embodiment of the halftone processor.

FIG. 27 shows an outline of the arrangement of the fourth embodiment of a halftone processor 135 as the core of the present invention. This halftone processor 135 comprises a high density detecting means 7001, a threshold processing means 7002, a threshold generating means 7003, a first basic dither information storage means 7004 of image portion clustered type, and a second basic dither information storage means 7005 of non-image portion clustered type.

The high density detecting means 7001 is the same as the high density detecting means 4002 shown in FIG. 3, so a detailed description thereof will be omitted.

Figure 28:
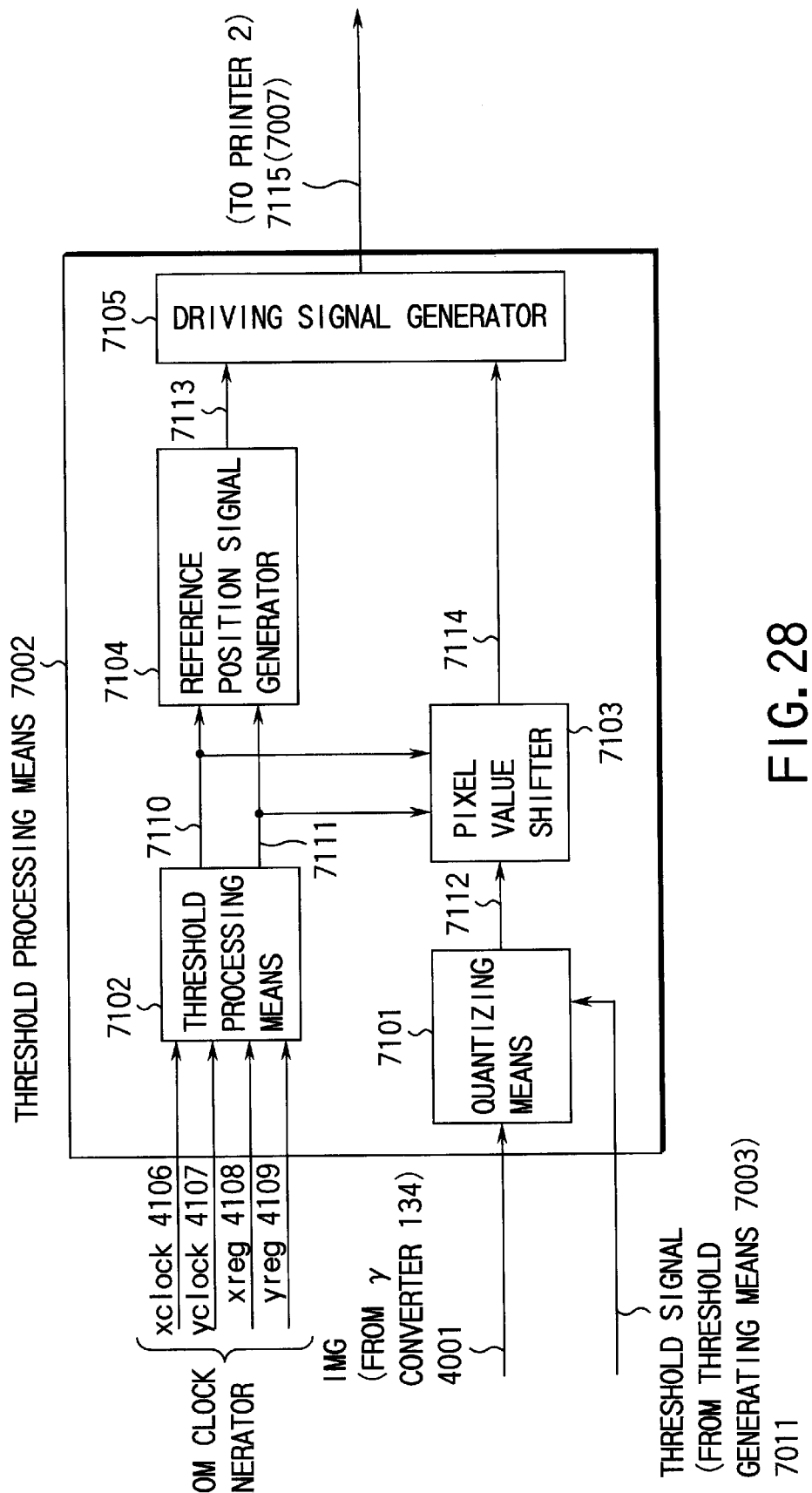
FIG. 28 is a block diagram for explaining a threshold processing means.

FIG. 28 shows the configuration of the threshold processing means 7002. This threshold processing means 7002 includes a quantizing means 7101, a pixel position calculator 7102, a pixel value shifter 7103, a reference position signal generator 7104, and a driving signal generator 7105.

That is, only the quantizing means 4101 of the second halftone processing means 4004 s shown in FIG. 4 is replaced with the quantizing means 7101. In this configuration, the pixel position calculator 7102 outputs coordinate information x 7110 in a main scan direction and coordinate information y 7111 in a sub-scan direction. The quantizing means 7101 outputs an image density signal 7112. The pixel value shifter 7103 outputs an image density signal 7114. The reference position signal generator 7104 outputs a reference position signal 7113. A driving signal generator 7105 outputs a recording device driving signal 7115.

The quantizing means 7101 receives a threshold signal 7011 from the threshold generating means 7003 and quantizes on the basis of this threshold signal 7011. By removing the reference position generating means, this configuration can be applied to power modulation type laser recording electrophotography. In this embodiment, this application will be explained.

FIG. 29A shows an example of a first dither matrix of image portion clustered type stored in the first basic dither information storage means 7004.

FIG. 29B shows an example of a second dither matrix of non-image portion clustered type stored in the second basic dither information storage means 7005.

The configuration of a system dither processing means will be briefly described below. The first dither matrix of image portion clustered type and the second dither matrix of non-image portion clustered type, each of which is basic dither information, are stored as a dither matrix D(i,j) (i,j=0, 1, ..., Nd−1) in DRAMs (not shown) on two-dimensional arrays of the storage means 7004 and 7005, respectively.

On the basis of a halftone processing selecting signal Si 7008 output from the high density detecting means 7001, the threshold generating means 7003 uses the second dither matrix (signal 7009) of non-image portion clustered type if a pixel to be processed has high density, or uses the first dither matrix (signal 7010) of image portion clustered type if the density is not high, thereby determining a threshold value Thk (k=1, ..., N−1) for a main scan/sub-scan position (I,J) by $$Thk=(255/N-1)\times(k-1)+[255/\{(N-1)\times(Nd^2-1)\}]\times D(I \bmod Nd, J \bmod Nd)$$

Note that quantization is performed to N values. The threshold generating means 7003 outputs the calculated threshold value Thk (k=1, ..., N−1) to the threshold processing means 7002 as the threshold signal 7011.

The threshold processing means 7002 quantizes on the basis of this threshold signal 7011. When the second dither matrix of non-image portion clustered type shown as an example is used, as the density increases image portions appear from the perimeter of the matrix and non-image portions cluster to the center to form halftone dots.

That is, in this fourth embodiment, at low and medium densities the first dither matrix of image portion clustered type is used to form image portions as halftone dots and thereby reproduce images stably. At high densities, the second dither matrix of non-image portion clustered type is used to form non-image portions as halftone dots, i.e., cluster non-image portions of a plurality of pixels and thereby reproduce images stably. This gray level processing apparatus operates in this way.

Figure 30:
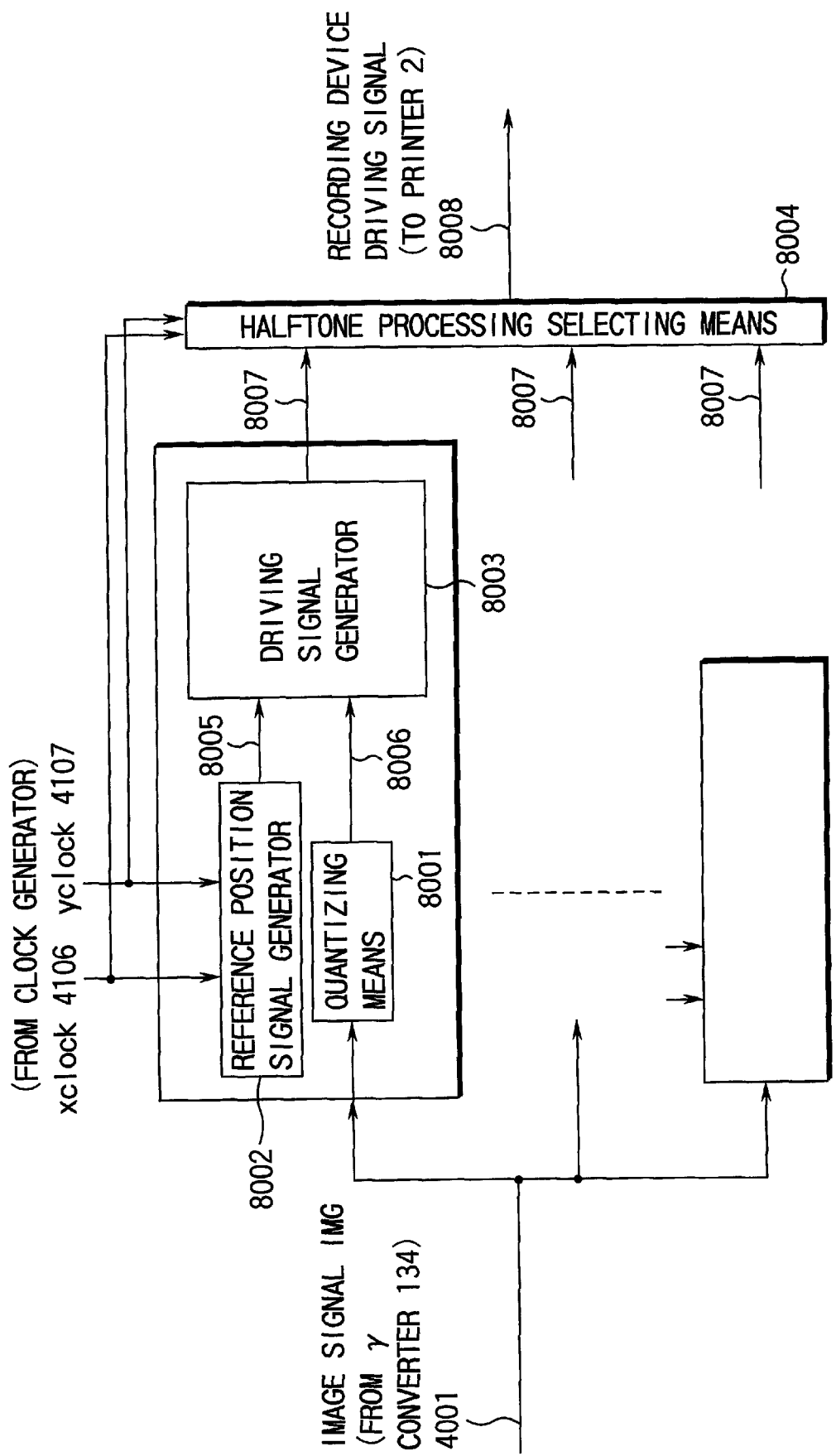
FIG. 30 is a block diagram showing an outline of the arrangement of the fifth embodiment of the halftone processor.

FIG. 30 shows an outline of the arrangement of the fifth embodiment of a halftone processor 135 as the core of the present invention. This halftone processor 135 comprises a plurality of quantizing means 8001 using look-up tables, a plurality of reference position signal generators 8002 respectively corresponding to the quantizing means 8001, a plurality of driving signal generators 8003 respectively corresponding to the quantizing means 8001 and to the reference position signal generators 8002, and a halftone processing selecting means 8004 for selectively outputting recording device driving signals 8007 from the driving signal generators 8003.

In accordance with internal look-up table information, each quantizing means 8001 quantizes an image signal IMG 4001 into an image density signal 8006 of a recording device and outputs this signal 8006.

One internal look-up table of each quantizing means 8001 has a saturable input/output characteristic as shown in FIG. 31, and another look-up table has an unsaturable input/output characteristic as shown in FIG. 32. Each quantizing means 8001 quantizes the image signal IMG 4001 in accordance with these look-up tables and outputs as the image density signal 8006 to the corresponding driving signal generator 8003.

Each reference position signal generator 8002 periodically generates a reference position signal 8005 in accordance with externally input clock signals xclock 4106 and yclock 4107 in the main scan direction and the sub-scan direction, respectively, and outputs them to the corresponding driving signal generator 8003.

Each driving signal generator 8003 outputs to the halftone processing selecting means 8004 a recording device driving signal 8007 generated on the basis of the image density signal 8006 and the reference position signal 8005 supplied.

The halftone processing selecting means 8004 has a counter (not shown) for counting the main-scan clock signal xclock 4106 and a counter (not shown) for counting the sub-scan clock signal yclock 4107. On the basis of two-dimensional coordinates (x,y) indicated by the counts of these counters, the halftone processing selecting means 8004 periodically selects the recording device driving signal 8007 from one of the driving signal generators 8003 and externally outputs the selected signal as a recording device driving signal 8008.

For example, when x%2=0 the halftone processing selecting means 8004 selects the recording device driving signal 8007 generated by the image density signal 8006 from the quantizing means 8001 having the look-up table shown in FIG. 31. When x%2=1, the halftone processing selecting means 8004 selects the recording device driving signal 8007 generated by the image density signal 8006 from the quantizing means 8001 having the look-up table shown in FIG. 32. Assume that the reference position signal is fixed to "left". x2% indicates the remainder when the coordinate x in the main scan direction of a pixel to be processed is divided by 2.

If this is the case, the recording device driving signal 8008 output from the halftone processing selecting means 8004 has an output pattern shown in FIG. 33 at low and medium densities and an output pattern as shown in FIG. 34 at high densities.

As can be seen from FIGS. 31 to 34, at low and medium densities smaller than a threshold value Th1, the output pattern has a vertical one-pixel line structure. At high densities equal to or larger than the threshold value Th1, non-image portions are clustered and output in units of two pixels. In a high-density portion, non-image portions of a plurality of pixels are clustered. This reduces intermediate transition regions and makes stable reproduction of the high-density portion feasible.

The above fifth embodiment employs quantizing means using look-up tables. However, these quantizing means can also be replaced with image density converting means using look-up tables in accordance with the characteristics of a printer 2.

Also, the above fifth embodiment is applicable to power modulation type laser recording electrophotography by removing the reference position signal generator.

Furthermore, in the above fifth embodiment the halftone processing is periodically selected in the main scan direction. However, an output pattern having a screen angle can also be formed by changing the initial phase of this selection period whenever scan is performed.

As another embodiment, the formation of non-image portions as long halftone will be described below. By using the quantizing means 8001 having look-up tables shown in FIGS. 31, 35, and 36, the halftone processing selecting means 8004 switches the recording device driving signals 8008 to be output externally at a period shown in FIG. 37. The reference position signal is fixed to "left".

Output patterns are as shown in FIG. 33 when the normalized image density is equal to or smaller than the threshold value Th1, as shown in FIG. 38 when it is equal to or larger than the threshold value Th1 and ⅞ or less, and as shown in FIG. 39 when it is ⅞ or more.

As is apparent from FIGS. 35, 36, 38, and 39, at low and medium densities equal to or smaller than the threshold value Th1, the output pattern has a vertical one-pixel line structure when the density is equal to or larger than the threshold value Th1, halftone holes of a maximum of 2×2 pel form. As the normalized image density approaches 1, halftone dots reduce in the main scan direction.

Another invention can be made by giving the look-up table shown in FIG. 30 a property of quantizing an input pixel corresponding to a low-density portion to 0, or to an image density signal in a range within which no image is formed, and a property of quantizing an input pixel corresponding to a low-density portion to an image density signal in a range within which an image is formed.

For example, when x%2=0 the halftone processing selecting means 8004 selects the recording device driving signal 8007 generated by the image density signal 8006 from the quantizing means 8001 having a look-up table shown in FIG. 40. When x%2=1, the halftone processing selecting means 8004 selects the recording device driving signal 8007 generated by the image density signal 8006 from the quantizing means 8001 having a look-up table shown in FIG. 41. Assume that the reference position signal is fixed to "left". x2% indicates the remainder when the coordinate x in the main scan direction of a pixel to be processed is divided by 2.

The look-up table shown in FIG. 40 quantizes in a range within which an image is formed in a low-density portion and quantizes in a saturated range in a high-density portion (the normalized image density is equal to or larger than the threshold value Th1).

The look-up table shown in FIG. 41 forms no image in a low-density portion (the normalized image density is equal to or smaller than the threshold value Th2) and quantizes in an unsaturated range in a high-density portion.

The output patterns are as shown in FIG. 42 in a low-density portion (the normalized image density is equal to or smaller than the threshold value Th2), as shown in FIG. 33 in a medium-density portion, and as shown in FIG. 34 in a high-density portion (the normalized image density is equal to or larger than the threshold value Th1).

As shown in FIG. 42, in a low-density portion the output pattern has a vertical two-pixel line structure, i.e., image portions of two pixels are clustered to allow stable reproduction.

As shown in FIG. 34, in a high-density portion the output pattern has a vertical two-pixel line structure, i.e., non-image portions of two pixels are clustered to allow stable reproduction.

That is, this invention is adaptive gray level processing by which an image portion is elongated in a low-density portion and a non-image portion is elongated in a high-density portion, thereby stabilizing the reproduction, and a vertical one-pixel line structure having higher resolution is used at intermediate densities.

The above fifth embodiment employs quantizing means using look-up tables. However, these quantizing means can also be replaced with image density converting means using look-up tables in accordance with the characteristics of a printer 2.

Also, the above fifth embodiment is applicable to power modulation type laser recording electrophotography by removing the reference position signal generator.

Furthermore, in the above fifth embodiment the halftone processing is periodically selected in the main scan direction. However, an output pattern having a screen angle can also be formed by changing the initial phase of this selection period whenever scan is performed.

As has been described above, by the use of gray level processing by which non-image portions of a plurality of pixels are clustered in a high-density portion, it is possible to reduce the area of unstable intermediate transition regions and improve the reproducibility and stability of a pixel structure in a high-density portion.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image forming method comprising the steps of:
   reading an image signal in units of pixels;
   generating a first driving signal corresponding to an image portion and a non-image portion in one pixel based on the read image signal of each pixel;
   generating a second driving signal for clustering non-image portions of a plurality of pixels, on the basis of the read image signal of each pixel and an image signal of a peripheral pixel;
   detecting whether the read image signal of each pixel has a density not less than a predetermined density;
   selectively outputting the first driving signal if the image signal of the detected pixel has a density not less than the predetermined density;
   selectively outputting the second driving signal if the image signal of the detected pixel has a density not more than the predetermined density;
   outputting a laser beam on the basis of the selectively output first or second driving signal;
   forming a latent image on a photosensitive body with the laser beam; and
   forming an image by developing the formed latent image with toner.

2. A method according to claim 1, wherein the step of generating the second driving signal for clustering non-image portions of a plurality of pixels, on the basis of the read image signal of each pixel and the image signal of the peripheral pixel, comprises the steps of:

generating coordinate information in a main scan direction and coordinate information in a sub-scan direction on the basis of a pixel position of the read image signal;

generating a reference position signal in the pixel from the coordinate information in the main scan direction and the coordinate information in the sub-scan direction;

quantizing the read image signal of each pixel in accordance with a predetermined threshold value and outputting the quantized signal as an image density signal;

outputting an image density signal of a pixel to be processed after pixel value shifting, from the coordinate information in the main scan direction, the coordinate information in the sub-scan direction, and the quantized image density signal; and generating a recording device driving signal from the reference position signal in the pixel and the image density signal of the pixel to be processed after pixel value shifting, and outputting the driving signal as a second driving signal.

3. A method according to claim 2, wherein the step of outputting the image density signal of the pixel to be processed after pixel value shifting, from the coordinate information in the main scan direction, the coordinate information in the sub-scan direction, and the quantized image density signal, comprises the steps of:

buffering sequentially supplied quantized density signals of pixels to be processed and outputting each buffered value as peripheral pixel density data; and outputting an image density signal after a shifting process, from the output peripheral pixel density data, the quantized image density signal, the coordinate information in the main scan direction, and the coordinate information in the sub-scan direction.

4. A method according to claim 3, wherein the step of outputting the image density signal after a shifting process, from the output peripheral pixel density data, the quantized image density signal, the coordinate information in the main scan direction, and the coordinate information in the sub-scan direction, comprises the steps of:

calculating a pixel shift value from the peripheral pixel density data, the quantized image density signal, the coordinate information in the main scan direction, and the coordinate information in the sub-scan direction;

storing the calculated pixel shift value; and outputting the image density signal after a shifting process, from the stored pixel shift value, the peripheral pixel density data, the quantized image density signal, the coordinate information in the main scan direction, and the coordinate information in the sub-scan direction.

5. A method according to claim 4, wherein the step of outputting the image density signal after a shifting process, from the stored pixel shift value, the peripheral pixel density data, the quantized image density signal, the coordinate information in the main scan direction, and the coordinate information in the sub-scan direction, comprises the steps of:

outputting a shift amount operation mode signal on the basis of the coordinate information in the main scan direction and the coordinate information in the sub-scan direction;

outputting various image density signals and pixel shift values from the peripheral pixel density data, the image density signal, and the pixel shift value corresponding to the pixel to be processed;

decoding the shift amount operation mode signal and outputting a shift amount operation selector signal; and selectively outputting the plurality of image density signals and pixel shift values on the basis of the output shift amount operation selector signal, thereby outputting an image density signal for clustering non-image portions of a plurality of pixels.

6. An image forming apparatus comprising:

reading means for reading an image signal in units of pixels;

first generating means for generating a first driving signal corresponding to an image portion and a non-image portion in one pixel based on the image signal of each pixel read by said reading means;

second generating means for generating a second driving signal for clustering non-image portions of a plurality of pixels on the basis of the image signal of each pixel read by said reading means and an image signal of a peripheral pixel;

detecting means for detecting whether the image signal of each pixel read by said reading means has a density not less than a predetermined density;

first output means for selectively outputting the first driving signal generated by said first generating means if the image signal of the pixel detected by said detecting means has a density not less than the predetermined density, and selectively outputting the second driving signal generated by said second generating means if the image signal of the pixel detected by said detecting means has a density not more than the predetermined density;

second output means for outputting a laser beam on the basis of the first or second driving signal selectively output by said first output means;

forming means for forming a latent image on a photosensitive body with the output laser beam from said second output means; and developing means for forming an image by developing with toner the latent image formed by said forming means.

7. An apparatus according to claim 6, wherein said second generating means comprises:

third generating means for generating coordinate information in a main scan direction and coordinate information in a sub-scan direction on the basis of a pixel position of the image signal read by said reading means;

fourth generating means for generating a reference position signal in the pixel from the coordinate information in the main scan direction and the coordinate information in the sub-scan direction generated by said third generating means;

third output means for quantizing the image signal of each pixel read by said reading means in accordance with a predetermined threshold value and outputting the quantized signal as an image density signal;

fourth output means for outputting an image density signal of a pixel to be processed after pixel value shifting, from the coordinate information in the main scan direction and the coordinate information in the sub-scan direction generated by said third generating means, and the image density signal quantized by said third output means; and fifth output means for generating a recording device driving signal from the reference position signal in the pixel generated by said fourth generating means and the image density signal of the pixel to be processed after pixel value shifting output from said fourth output means, and outputting the generated signal as a second driving signal.

8. An apparatus according to claim 7, wherein said fourth output means comprises:

sixth output means for buffering sequentially supplied quantized density signals of pixels to be processed and outputting each buffered value as peripheral pixel density data; and seventh output means for outputting an image density signal after a shifting process, from the output peripheral pixel density data from said sixth output means, the image density signal quantized by said third output means, and the coordinate information in the main scan direction and the coordinate information in the sub-scan direction generated by said third generating means.

9. An apparatus according to claim 8, wherein said seventh output means comprises:

calculating means for calculating a pixel shift value from the output peripheral pixel density data from said sixth output means, the image density signal quantized by said third output means, and the coordinate information in the main scan direction and the coordinate information in the sub-scan direction generated by said third generating means;

storage means for storing the calculated pixel shift value; and eighth output means for outputting the image density signal after a shifting process, from the pixel shift value stored in said storage means, the output peripheral pixel density data from said sixth output means, the image density signal quantized by said third output means, and the coordinate information in the main scan direction and the coordinate information in the sub-scan direction generated by said third generating means.

10. An apparatus according to claim 9, wherein said eighth output means comprises:

ninth output means for outputting a shift amount operation mode signal on the basis of the coordinate information in the main scan direction and the coordinate information in the sub-scan direction generated by said third generating means;

10th output means for outputting various image density signals and pixel shift values from the output peripheral pixel density data from said sixth output means, the image density signal quantized by said third output means, and the pixel shift value corresponding to the pixel to be processed stored in said storage means;

11th output means for decoding the output shift amount operation mode signal from said ninth output means and outputting a shift amount operation selector signal; and 12th output means for selectively outputting the plurality of image density signals and pixel shift values, output from said 10th output means, on the basis of the output shift amount operation selector signal from said 11th output means, thereby outputting an image density signal for clustering non-image portions of a plurality of pixels.

11. An image processing apparatus comprising:

detecting means for detecting whether a density of an image signal of an input pixel is not less than a predetermined density;

first converting means for converting the image signal into image signals of an image portion and a non-image portion for each pixel on the basis of the density of the image signal of each input pixel and a pixel position of each input pixel;

second converting means for converting the image signal into image signals of an image portion and a non-image portion for each pixel, on the basis of the density of the image signal of each input pixel and the pixel position of each input pixel, thereby clustering image signals of non-image portions of a plurality of pixels; and output means for selectively outputting the image signal from said second converting means if said detecting means detects that the density of the image signal of the input pixel is not less than the predetermined density, and selectively outputting the image signal from said first converting means if said detecting means detects that the density of the image signal of the input pixel is not more than the predetermined density.

12. An apparatus according to claim 11, further comprising:

third converting means for converting the image signal into image signals of an image portion and a non-image portion for each pixel, on the basis of the density of the image signal of each input pixel and the pixel position of each input pixel, thereby clustering image signals of image portions of a plurality of pixels, wherein said detecting means detects whether the density of the image signal of the input pixel is not less than a first density or not less than a second density higher than the first density, and said output means selectively outputs the image signal from said second converting means if said detecting means detects that the density of the image signal of the input pixel is not less than the second density, selectively outputs the image signal from said first converting means if said detecting means detects that the density of the image signal of the input pixel is not more than the second density and not less than the first density, and selectively outputs the image signal from said third converting means if said detecting means detects that the density of the image signal of the input pixel is not more than the first density.

13. An apparatus according to claim 11, wherein said second converting means clusters image signals of non-image portions in units of two or three pixels.

14. An apparatus according to claim 11, wherein said second converting means comprises:

first generating means for generating coordinate information in a main scan direction and coordinate information in a sub-scan direction based on the pixel position of the input pixel;

second generating means for generating a reference position signal in the pixel from the coordinate information in the main scan direction and the coordinate information in the sub-scan direction generated by said first generating means;

second output means for quantizing the image signal of the input pixel in accordance with a predetermined threshold value and outputting the quantized signal as an image density signal;

third output means for outputting an image density signal of a pixel to be processed after pixel value shifting, from the coordinate information in the main scan direction and the coordinate information in the sub-scan direction generated by said first generating means and the image density signal quantized by said second output means; and fourth output means for outputting as the reference position signal in the pixel generated by said second generating means and the image density signal of the pixel to be processed after pixel value shifting output from said third output means.

15. An apparatus according to claim 14, wherein said second output means quantizes the image signal of the input pixel by error diffusion in accordance with an image density of a peripheral pixel.

16. An image processing apparatus comprising:

detecting means for detecting whether a density of an image signal of an input pixel is not less than a predetermined density;

first storage means for storing first basic dither information of a dither matrix used to cluster non-image portions of a plurality of pixels;

second storage means for storing second basic dither information of a dither matrix used to cluster image portions of a plurality of pixels;

first output means for selecting the first basic dither information stored in said first storage means if the density of the image signal of the pixel detected by said detecting means is not less than the predetermined density, selecting the second basic dither information stored in said second storage means if the density of the image signal of the pixel detected by said detecting means is not more than the predetermined density, and outputting dither information, based on the first or second basic dither information selected and a pixel position of the input pixel, as a threshold value;

second output means for quantizing the image signal of the input pixel by the threshold value from said first output means and outputting the quantized image signal;

first generating means for generating coordinate information in a main scan direction and coordinate information in a sub-scan direction based on the pixel position of the input pixel;

second generating means for generating a reference position signal in the pixel from the coordinate information in the main scan direction and the coordinate information in the sub-scan direction generated by said first generating means;

third output means for outputting an image density signal of a pixel to be processed after pixel value shifting, from the coordinate information in the main scan direction and the coordinate information in the sub-scan direction generated by said first generating means and the image density signal quantized by said second output means; and fourth output means for outputting as the reference position signal in the pixel generated by said second generating means and the image density signal of the pixel to be processed after pixel value shifting output from said third output means.

17. An image processing apparatus comprising:

a plurality of converting means for converting each input pixel of a two-dimensional image in a main scan direction and a sub-scan direction into an image density signal;

a plurality of generating means provided in one-to-one correspondence with said plurality of converting means to generate a driving signal on the basis of the image density signal from a corresponding converting means; and output means for selecting the driving signal from one of said generating means at each main scan period of each input pixel of the image, and periodically changing a main-scan-direction initial phase, selected whenever scan is performed, in the sub-scan direction and outputting the phase, wherein said converting means include converting means for converting an input pixel corresponding to a high-density portion into an image density signal in a saturated range and converting means for converting an input pixel corresponding to a high-density portion into an image density signal in an unsaturated range.

18. An image processing apparatus comprising:

a plurality of converting means for converting each input pixel of a two-dimensional image in a main scan direction and a sub-scan direction into an image density signal;

a plurality of generating means provided in one-to-one correspondence with said plurality of converting means to generate a driving signal on the basis of the image density signal from a corresponding converting means; and output means for selecting the driving signal from one of said generating means at each main scan period of each input pixel of the image, and periodically changing a main-scan-direction initial phase, selected whenever scan is performed, in the sub-scan direction and outputting the phase, wherein said converting means include converting means for converting an input pixel corresponding to a high-density portion into an image density signal in a saturated range, converting means for converting an input pixel corresponding to a high-density portion into an image density signal in an unsaturated range, converting means for converting an input pixel corresponding to a low-density portion into zero or an image density signal in a range within which no image is formed, and converting means for converting an input pixel corresponding to a low-density portion into an image density signal in a range within which an image is formed.

* * * * *